United States Patent [19]

Morrison, Jr.

[11] Patent Number: 4,714,891
[45] Date of Patent: Dec. 22, 1987

[54] METHOD AND APPARATUS FOR IMPROVING THE SAFETY AND EXTENDING THE RANGE OF IONIZATION GAUGE SYSTEMS

[75] Inventor: Charles F. Morrison, Jr., Boulder, Colo.

[73] Assignee: Granville-Phillips Company, Boulder, Colo.

[21] Appl. No.: 778,719

[22] Filed: Sep. 23, 1985

[51] Int. Cl.[4] .................. G01N 27/62; H02H 3/00
[52] U.S. Cl. ................................. 324/459; 324/500; 328/7; 361/42
[58] Field of Search .............. 324/459, 460, 461, 462, 324/463, 51; 361/42, 45, 44; 328/7, 10, 225; 313/363.1

[56] References Cited

U.S. PATENT DOCUMENTS

| | | |
|---|---|---|
| 2,595,611 | 5/1952 | Simpson et al. ............... 328/225 X |
| 3,321,701 | 5/1967 | Crowell ............................ 324/460 |
| 3,342,993 | 9/1967 | O'Halloran et al. ......... 313/363.1 X |
| 4,224,579 | 9/1980 | Marlett et al. ................ 372/33 X |
| 4,450,409 | 5/1984 | Castleman et al. ............. 324/460 |
| 4,477,768 | 10/1984 | Hiramoto et al. ............. 324/51 |
| 4,559,477 | 12/1985 | Leung et al. ............. 313/363.1 X |

Primary Examiner—Reinhard J. Eisenzopf
Assistant Examiner—Robert W. Mueller
Attorney, Agent, or Firm—Gerald J. Ferguson, Jr.; Michael P. Hoffman; Michael J. Foycik, Jr.

[57] ABSTRACT

Different approaches are described, in ionization gauges or the like, which either prevent dangerous open ground conditions and/or sense the presence of the open ground whereby the controller power may be automatically turned off. Circuitry for extending the measurement range of ionization gauges is also described.

70 Claims, 28 Drawing Figures

EMISSION CURRENT
50 mA/DIV.

GRID VOLTAGE
200 V/DIV.

GRID CURRENT
5 AMP./DIV.

GRID VOLTS
200 V/DIV.

| | | | |
|---|---|---|---|
| a GLOW DISCHARGE | e ARC TO GROUND | i ARC TO FILAMENT |
| b ARC TO GROUND | f GLOW DISCHARGE | j GLOW DISCHARGE |
| c GLOW DISCHARGE | g ARC TO FILAMENT | k EXTINGUISHED—OPEN FUSE |
| d ARC TO FILAMENT | h GLOW DISCHARGE | |

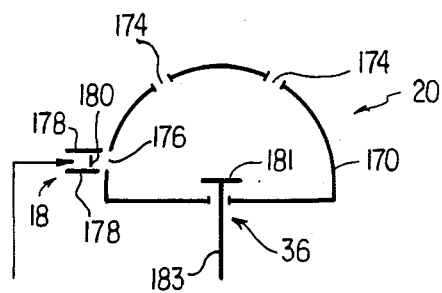
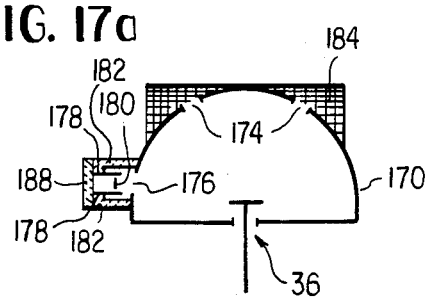
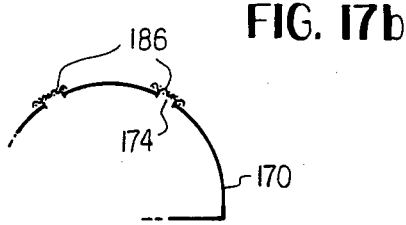
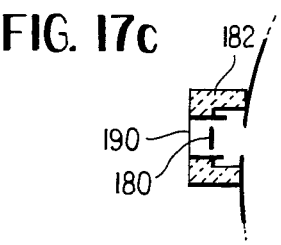
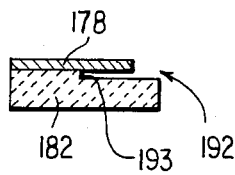
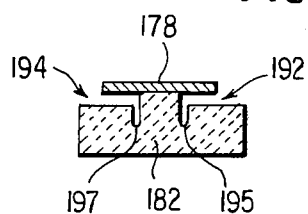
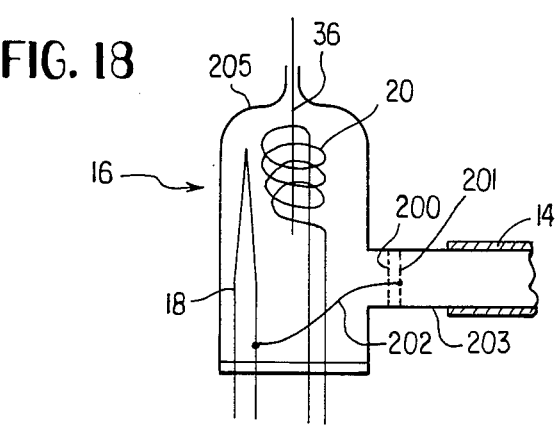
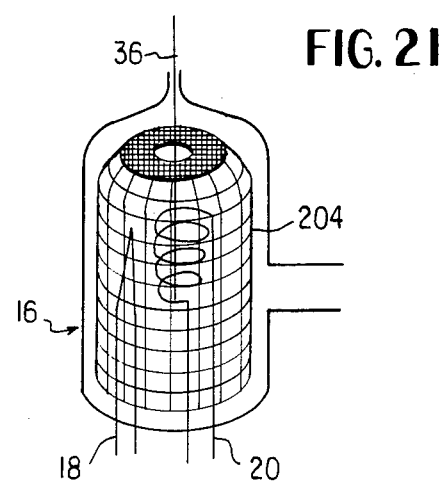

METHOD AND APPARATUS FOR IMPROVING THE SAFETY AND EXTENDING THE RANGE OF IONIZATION GAUGE SYSTEMS

BACKGROUND OF THE INVENTION

This invention relates to ionization gauges and, in particular, to a method and apparatus for improving the safety and extending the range of such gauges.

The Bayard-Alpert (BA) types of ionization gauge is more than likely the most popular of the high vacuum measurement transducers. Recent tests conducted by the present applicant have, however, disclosed a danger to personnel associated with certain conditions of use of this gauge. In particular, the present applicant has discovered the danger is caused by a conductive plasma which flows from the gauge into the vacuum chamber associated with the gauge. The plasma electrocally couples the metal parts of the chamber to the most positive electrode of the gauge, typically the grid thereof. That is, at pressures of 0.1 Pa, and greater, a BA gauge typically generates sufficient plasma that significant coupling can occur between the grid of the BA tube and the metal parts of the vacuum chamber. This is especially severe during electron bombardment degassing, which involves both glow discharge and vacuum arc mechanisms. This coupling causes significant currents to flow through the ground between the vacuum chamber and controller chassis. Loss of the vacuum chamber ground connection at these pressures floats the chamber at a voltage near that of the BA gauge grid. Contact between ground and the vacuum chamber could be lethal under these conditions of open ground and high pressure.

To investigate the foregoing phenomena, the present applicant arranged a vacuum system as shown in FIG. 1, which includes a mechanical fore pump 10, a diffusion pump 12, a valve V2 connected between pumps 10 and 12, a cold trap 15, valves V1 and V3 where test gas from a source not shown was applied through V3, and ionization gauge G1 and gauge G2, G1 being the gauge in which the phenomena was investigiated and G2 monitoring the pressure in G1.

FIG. 2 illustrates a prior art ionization gauge 16, which may correspond to gauge G1 of FIG. 1 where the gauge may be connected to a vacuum system such a system 14 as indicated in FIG. 6. Gauge 16 includes a filament 18 and a grid 20, the latter electrodes being of primary interest. The collector electrode and its associated electrometer circuit are not shown in FIG. 2 because they do not enter significantly into the gas dishcarge interactions under investigation. Also shown in FIG. 2 is a block diagram of a conventional gauge controller indicated at 22 including a filament power circuit 24, a filament bias circuit 26 which typically provides a filament bias of 30 volts, and a degas power circuit 28, and a ground 30 for the controller.

The normal operation of an ionization gauge requires the generation of ions and liberated electrons of quantities proportional to the pressure being measured. This ionization is not usually thought of as gas discharge formation because there is no visible glow such as is seen in neon signs, florescent lights, glow tubes, etc., which are familiar discharge models. It seems normal one might start to see some discharge glow when the pressure nears $10^{-3}$ torr, for this is the pressure range of the glow discharge. The brightness and color of the glow will depend upon the pressure and the composition of the gas, for each gaseous element has a different spectrum of light given off as its excited ions and molecules return toward normal states after being hit by accelerated electrons.

As the pressure is raised in the measurement mode of operation, ionization gauge controller 22 should turn off tube filament 18 before the glow becomes very bright. Although the plasma in this situation is normal, as it becomes more dense from the increasing pressure, it interferes with the gauge function, making the gauge reading a less linear indication of the pressure. At a sufficiently high pressure, the gauge reading decreases, and eventually changes sign and indicates less than zero pressure. The filament 18 is automatically turned off by most controllers before this can happen. In some controllers the electron current from filament 18 to grid (anode) 20 is measured as a second safety check. If this current deviates from a programmed value, the filament is turned off. If this comparison circuitry is not used, the filament can remain on if it is accidentally turned on at any pressure sufficiently beyond the ion current reversal pressure. This can sometimes result in the burn-out of the filament, especially in those gauges with tungsten filaments.

Of major concern is the safety of the operator and those who touch the controller 22 and vacuum system 14. The generation of high plasma densities in the measurement mode of operation is not typical due to the automatic turn-off of the tube. Even the failure of the ground circuit somewhere between the controller and the vacuum system is not usually of extreme danger in this mode, unless the pressure is a millitorr, or greater. However, in this pressure range, voltages of up to 160 volts can give a brutal shock to an unwary operator who reestablishes this ground circuit with his body. This voltage is sufficient to cause filbrillation of the human heart, so represents a significant danger. Maintaining proper ground circuits on both the chamber and the controller avoids this danger.

Operation of the test equipment of FIG. 1 will now be described with respect to the degas mode of operation of gauge G1. Degas circuits available for cleaning ionization gauges are of two types, namely, electron bombardment (EB) and resistance ($I^2R$). EB degas operation is similar to the measurement operation, except that the grid voltage is raised from 180 volts to as high as 900 volts. Also, the emission current is increased from 10 mA to as much as 180 mA. There is now enough power to do significant cleaning. However, there is also enough power to be dangerous if something goes wrong. The EB degas grid voltage is typically the output from a high voltage transformer (not shown) that is full wave rectified, but not filtered. It is dc, but falls to nearly zero 120 times per second. The peak voltage can be as high as 900 V in some controllers.

The 30 V filament bias prevents electrons from reaching ground where the tube is in normal measurement operation. This bias keeps the electrons from interfering with the measurement of ion currents at the collector electrode which is operated near ground potential. In some controllers this filament bias circuit is not operated while degassing.

The high voltage and high emission current in the EB degas mode create much more plasma than is present in the measurement mode of operation. Thus, it is fully expected some purple glow will occur during the early stages of degassing a dirty gauge. The degas operation may be started in the $10^{-5}$ torr range, or lower, but the local pressure in the tube can increase significantly as the contaminating materials evaporate from the tube elements and nearby surfaces. Questions arise as to how much can the pressure be increased and what happens if the pressure is increased too much.

Using the equipment of FIG. 1, gauge G1 was degassed at low pressures. Valve V1 was then clsoed and valve V3 slightly opened with the EB degas power still applied. The pressure increased steadily, and eventually the emission or degas fuse (not shown) would blow. This implied that excessive emission currents had occurred.

Using an oscilloscope, the grid voltage was observed at a point A in FIG. 2, with respect to ground. Simultaneously, the current flowing through point A was monitored. The grid current during the moment before fuse failure was much higher than that which flows normally. This overcurrent was used as a trigger to take pictures of the fuse destructive half cycle.

FIG. 3 shows a few cycles of conventional operation in the $10^{-6}$ torr range at about 40 watts of degas power. The current was about 70 mA except for the short time periods when the grid voltage was too low to support this current. The grid voltage peaked at 780 V in this controller. The pressure was then increased gradually into the $10^{-3}$ torr range where, with degas power applied, the destructive half cycle associated with blowing the emission fuse would occur.

FIG. 4 illustrates the destructive half cycle. To obtain this picture, the oscilloscope scan rate was one msec/-division. The current sensitivity was now 5 amperes per division, versus 50 mA used in FIG. 3. The current was as high as 140 times that in normal operation. The grid voltage was very nearly constant at about 320 volts over much of the cycle. This nearly constant voltage was observed as currents varied from 200 mA (the scope trigger) up to about 4 amperes. This behavior was like that of older glow discharge voltage regulator tubes (OA3, etc.), but the current was many times higher than was permissible in those tubes. This mode was called the voltage regulator (VR) mode in the ionization gauge tube for purposes of these tests.

Following the voltage through the destructive half cycle, it suddenly dropped to almost zero, and the current increased more rapidly. This was a vacuum arc. This mode was called the arc mode. The arc and voltage regulator modes are violent, and not very stable, as indicated in FIG. 4. Thus the discharge changed back and forth between them. In dozens of pictures, no two patterns were totally identical.

As can be seen from FIG. 4, the arc sometimes had higher voltage versus ground than at other times. Consequently th current of A and B of FIG. 2 was measured. All of the current went through point A, but only about 10% of the voltage regulator current went through point B. The higher voltage arcs had full current through B, the lower voltage arcs passed no current through B.

Measurement of current through point C in the ground lead proved the point. Both the VR discharge and the low voltage vacuum arcs were to ground—not to other gauge electrodes! This requires plasma contact through many inches of glass tube. The currents involved in these ground return discharges were many amperes—in spite of $\frac{1}{4}$ ampere fast blow fuses.

The fuse blowing was always near the end of the half cycle. The fuse appeared to melt sooner than this, but then seemed to arc across the melt until the current fell to a low value near the end of the half cycle. This still is not dangerous if good grounds are present. However, the following question arises. If these currents pass through the common ground of grounds 30 and 32, what happens if this connection is missing, or unable to handle these large currents?

To test this, the ground connection 32 (FIG. 2) was broken to the vacuum system 14 but the controller was left in the rack with a proper ground. A voltmeter (not shown) was placed between vacuum chamber 14 and ground. The controller operated the ion gauge in the measurement mode, and in the degas mode to full pwoer (80 watts) with no more than about 20 volts of ac or dc appearing between the underground vacuum chamber and ground. Then the pressure was increased.

In the degas mode, at pressures of approximately $1 \times 10^{-3}$ torr for all gases tested, the voltmeter jumped to 740 volts (peak). The vacuum chamber was +740 volts relative to ground, and the fuse did not blow nor the circuit turn off. After the pressure was increased to the mid $10^{-3}$ torr range controller 22 would automatically turn off due to its emission current comparison circuit. If the pressure stabilized slightly below this, however, the chamber would remain at +740 volts until the degas circuit was manually turned off. Contact between ground and the vacuum system during this time could very possibly have been fatal.

Gauge G1 was a typical (BA) ion gage with a typical controller 22—both in good oeprating condition. The only fault was the missing ground wire to the vacuum system. The gauge tube pressure was no higher than might occur in a typical system when degassing the tube. But this could have killed anyone who made contact between the vacuum system and ground. This is graphically illustrated in FIG. 5 where plasma coupling between grid 20 and vacuum system is indicated at 34 and the current flow indicated by the arrows.

This test was repeated with the same controller with its chassis isolated—that is, disconnected from ground 30 and the vacuum system grounded. In this configuration the controller was driven to −740 volts by this overpressure reaction. Contact between the controller and ground could then have been fatal, also. All tubes and controllers tested gave very similar results.

The resistance type of degas circuit drives current through the wire of the grid, or through an auxiliary heating element. This is high current, usually about 10 amperes, but it uses very low voltage. The heated element typically glows orange. The gauge filament is not functional during this $I^2R$ degas operation in some controllers, but the grid voltage remains on in most of them. The present applicant has not observed a dangerous interaction between plasma and BA tubes while degassing using this type of controller. However, when the filament and grid are both operational during $I^2R$ degassing, a plasma coupling problem can again occur. This involves the same situation of current flow to ground as discussed before, even though the full VR mode voltage has not been applied. The filament emission seems to play a critical role in establishing and maintaining this auxiliary discharge. The voltage involved is typically 150 V at a few milliamperes. This will not blow the fuses, nor readily provide other evidence of its presence. Such a discharge may seem mild in compairson with the EB degas case, but it is still deadly in the absence of correct grounding, for it can fibrillate the human heart.

All of these ion gauge controller types are safe when correctly grounded. It is only the failure to have an available current path between the grounded chassis of controller 22 and the exposed metal parts of vacuum system 14 that provides danger. The danger is that the body could then provide such a pathway at any time while the gauge is encountering conditions that could couple power into that pathway, as illustrated in FIG. 5. The result could cost an operator his life.

All manufacturers insist on good grounding for their equipment. Consequently, those in the laboratory and production areas tend to assume this equipment will very seldom fail either (1) in a way that involves the safety grounds that are provided, or (2) in a manner that makes it obvious the safety ground is involved. It is perhaps even more unexpected to recognize a natural phenomenon (the plasma path 34) that leads to large currents through the safety ground circuits 30 and 32—especially one that is easily achieved in normal practice, and can involve voltages and currents of lethal significance.

A safety ground on most electronics equipment is not typically carrying intentional current flow. Thus its potential may differ by several volts from the ground of those vacuum systems which use the power common line as their ground. These two ground systems should have a common junction which is typically at the power distribution breaker box. See FIG. 6. Even though the resistance between these two grounds may be very low, and thus safe, any voltage difference resulting from unbalanced current flow in the vacuum system common lead wil complicate the use of the conventional ohm meter for verifying that low resistance. Even if there is no voltage difference, a resistance measurement accomplished with a few mA may give no clue to some of the problems detectable with more sginificant test currents. Accordingly, existing vacuum chamber/ionization gauge controller chassis grounding systems should be checked to establish they are complete and capable of supporting at least 10 amperes. The placement of a second ground wire (dashed line in FIG. 6) between the vacuum chamber and the gauge controller chassis is not a safe answer, for large continuous currents could flow through it.

OBJECTS OF THE INVENTION

It is thus a primary object of this invention to provide, in ionization gauges, means which either prevent the above dangerous current/voltage phenomenon and/or sense the presence of the above discussed open ground whereby the controller power may be automatically turned off.

It is a further primary object of this invention to provide means for extending the measurement range of ionization gauges.

Other objects and advantages of this invention will be apparent from a reading of the following specification and claims taken with the drawing.

BRIEF DESCRIPTION OF THE DRAWING

FIG. 16 is a schematic diagram of an illustrative gauge described in a copending application assigned to the assignee of the present invention.

FIGS. 17(a) through 17(e) are schematic diagrams of illustrative modifications made to the gauge of FIG. 16 in accordance with the present invention.

FIGS. 18 through 21 are schematic diagrams of further ionization gauges in accordance with the present invention.

DETAILED DESCRIPTION OF PREFERRED EMBODIMENTS OF THE INVENTION

Figure 1:
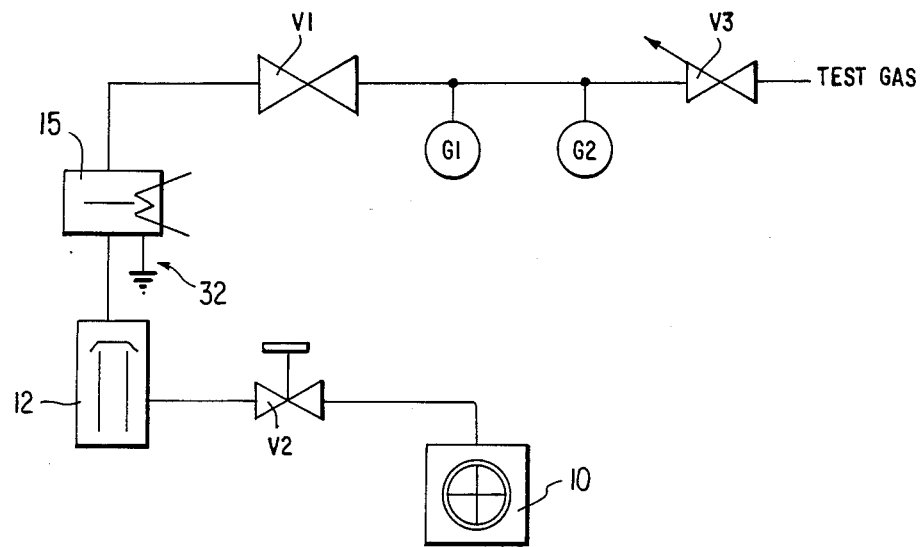
FIG. 1 is a schematic diagram of test equipment used to investigate the problem discovered by the present applicant.

Reference should be made to the drawing where like reference numberals refer to like parts.

Figure 7:
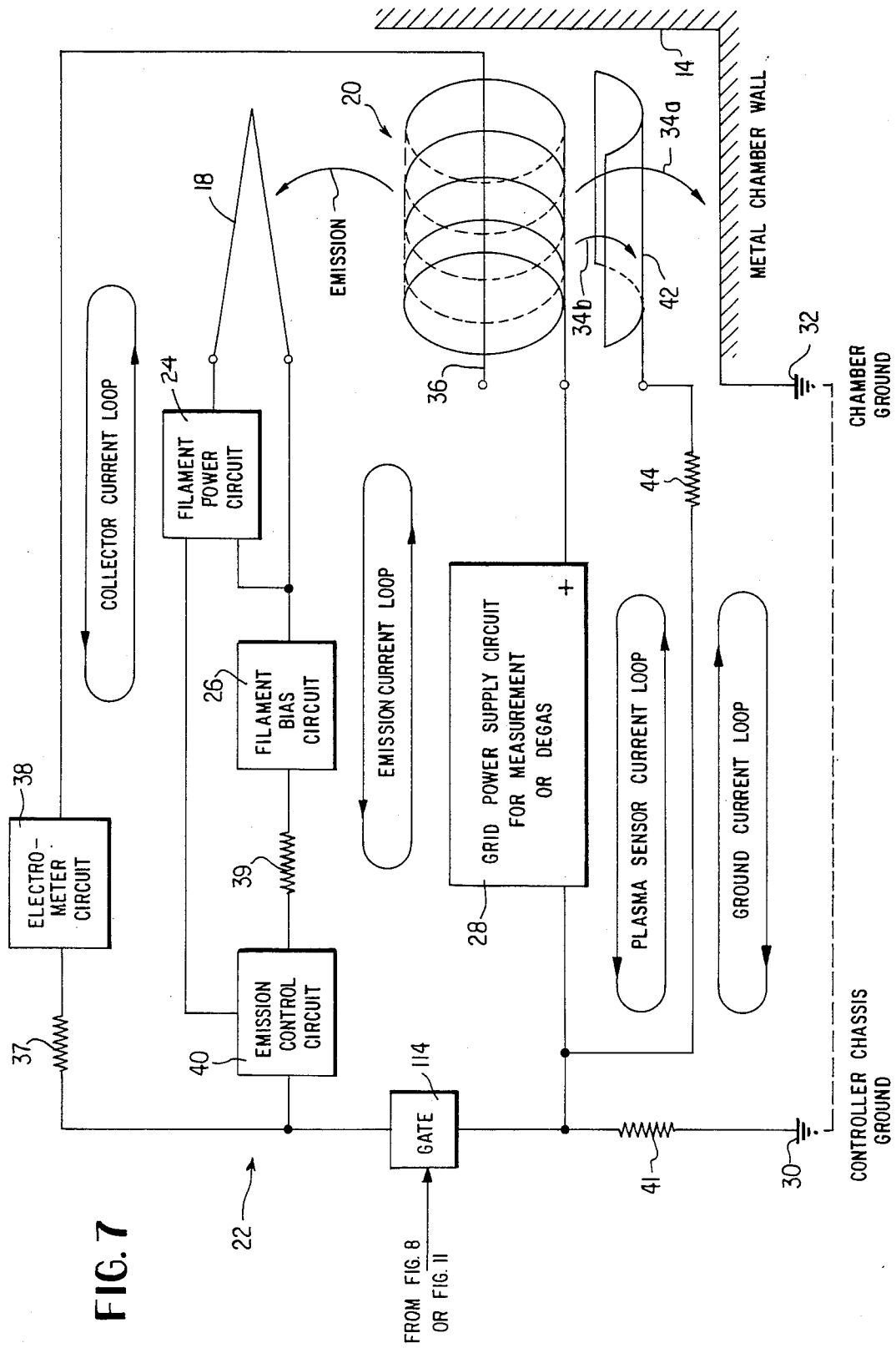
FIG. 7 is a schematic diagram of an illustrative ionization gauge system in accordance with the invention.

FIG. 7 shows an improved ionization gauge system in accordance with the present invention. In addition to the conventional circuitry shown in FIG. 2, a collector electrode 36 is shown connected to an electrometer circuit 38. Also shown is a conventional emission control circuit 40. The new elements added to the conventional circuitry in accordance with this embodiment of the present invention include a ground current sensing element such as resistor 41, an auxiliary, plasma sensing electrode 42, and a plasma current sensing resistor 44.

All electrodes of power significance including grid 20 are biased from ground. Thus, current can flow through plasma 34a from grid 20 through grounds 32 and 30 and resistor 41 back to the grid through circuit 28. The presently available current measurement and control circuits in controller 22 are not very sensitive to this extraneous ground current, for it does not flow through their sensing branch of the circuit which is indicated by the flow of emission current from grid 20 through filament 18, circuits 24 and 26, sensing resistor 39, emission control circuit 40, and circuit 28 back to the grid. It is most often when fuses and diodes blow that one becomes aware of the problem. An open ground lead between controller 22 and chamber 14 stops the ground current, but floats the chamber in the local plasma 34a. This couples the chamber to the anode (grid 20) of the gauge tube 16 sufficiently that the chamber is lifted to within 20 to 40 volts of the anode and large currents can flow if the chamber voltage is changed, as by human contact between the chamber and ground. The voltages and currents involved can be lethal, as discussed above.

The ground current returning from the metal vacuum chamber wall 14 through resistor 41 may be sensed in any conventional manner such as measuring the voltage across resistor 41. This also applies to the current sensing resistor 44 whereby voltages proportional to the currents may be developed and utilized.

Figure 8:
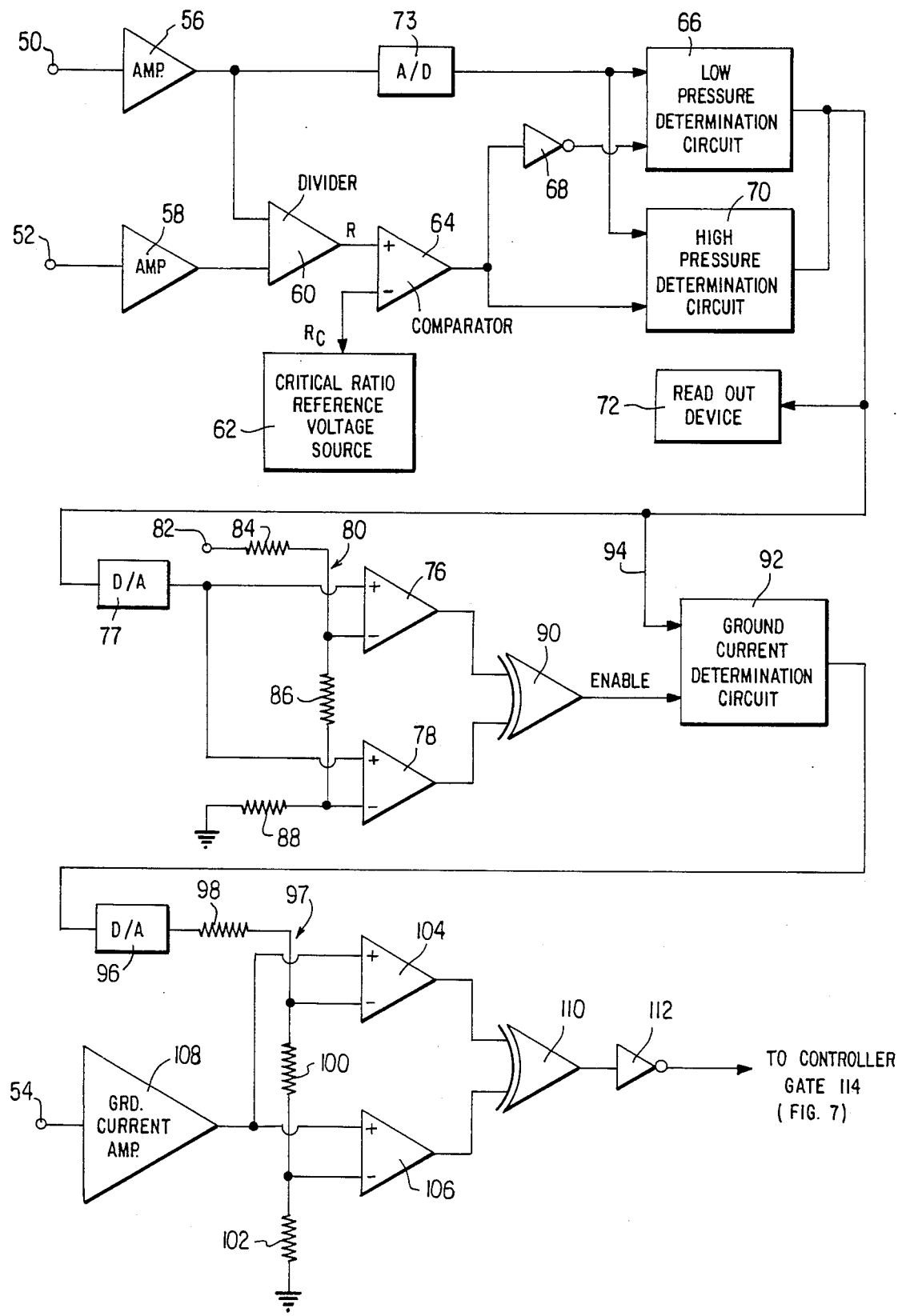
FIG. 8 is a block diagram of illustrative circuitry for use with the gauge system of FIG. 7 for extending the range and improving the safety thereof.
Figure 9:
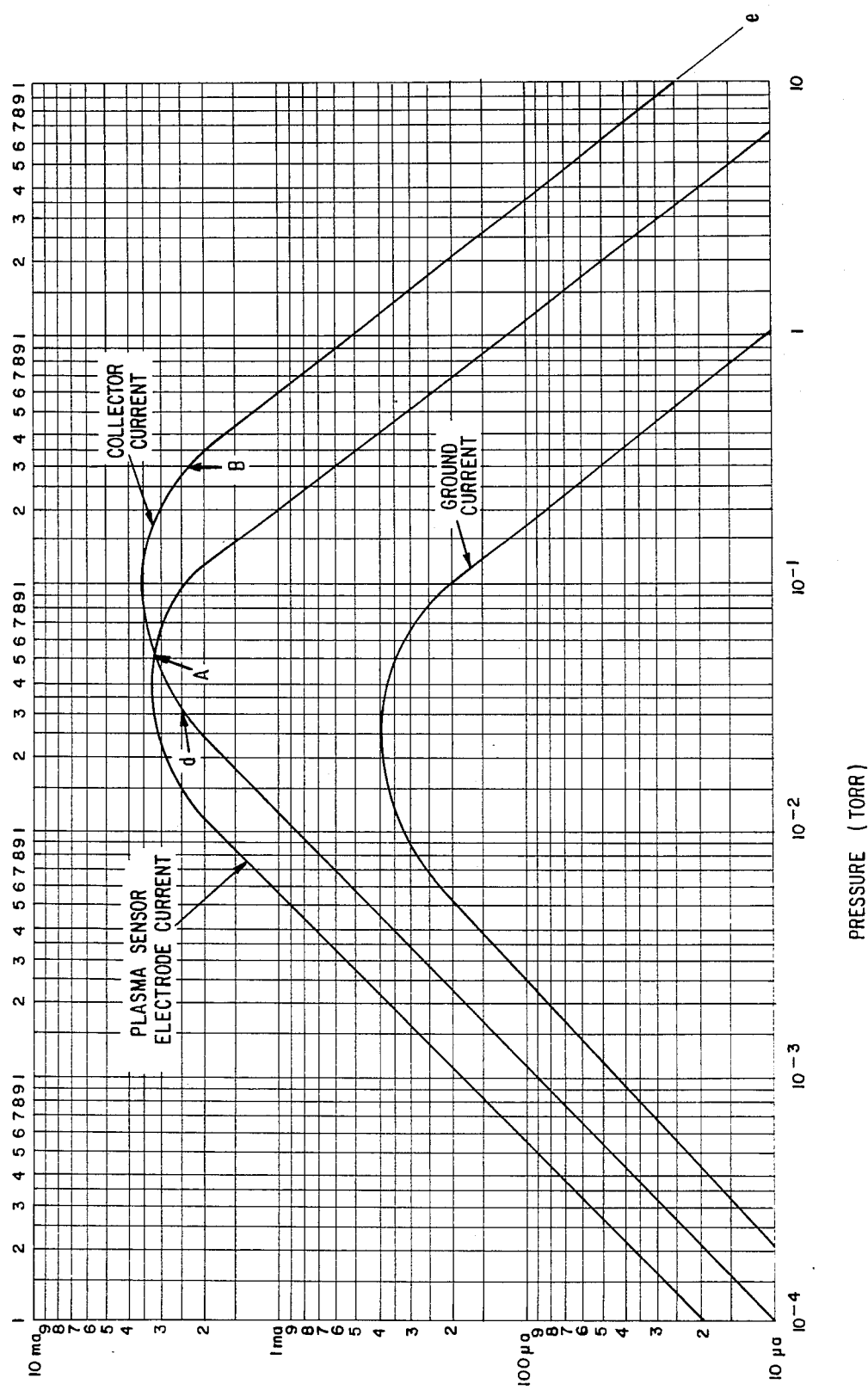
FIG. 9 is a graph of collector current, plasma sensor electrode current, and ground current versus pressure in the system of FIG. 7.

If the ground 30 of controller 22 is not common with the ground 32 of the metal parts of the vacuum chamber, there will be almost no current flow through resistor 41. However, at low pressures, typically less than about $5 \times 10^{-4}$ torr, there is little danger for an operator due to the low ground current which flows at these lower pressures. Thus, as can be seen in FIG. 9, at pressures less than $5 \times 10^{-4}$ torr, less than about 24 microamps of ground current typically flow. This amount of current is not typically considered dangerous. Thus, in accordance with a further feature of the invention, circuitry as illustrated in FIG. 8 may be employed to detect those pressures at which potentially dangerous currents can flow and to de-energize the gauge controller circuit 22 if an open ground condition is detected at these higher pressures. Moreover, as will be described in more detail below, the circuit of FIG. 8 provides a capability for extending the measurement range of an ionization gauge. In fact, this range extending capability of the circuitry may be utilized even if the ground fault detection portion of the circuitry is not employed.

With respect to the measurement range extension feature of the invention, it should be noted in FIG. 9 that controllers presently typically turn off filament 18 at point d on the collector current curve, this being the limit of the linear range of the left side of this curve. As can be seen point d typically corresponds to a pressure of about $3 \times 10^2$ torr. Attempts have been heretofore made to extend the measurement range beyond the point d. One of these attempts is illustrated in U.S. Pat. No. 4,314,205 wherein oscillating voltages are applied to the collector in such a manner as to enable an extension of the measurement range. However, the application of such oscillating voltages to the collector tends to destabilize gauge operations. As will be brought out below, the circuitry of the present invention extends the measurement range to the point e on the collector current curve without the application of oscillating voltages to the grid. The point e can be well above 10 torr and thus a substantial extension in the measurement range is provided with respect to those devices whose measurement range ends at the point d.

Figure 10:
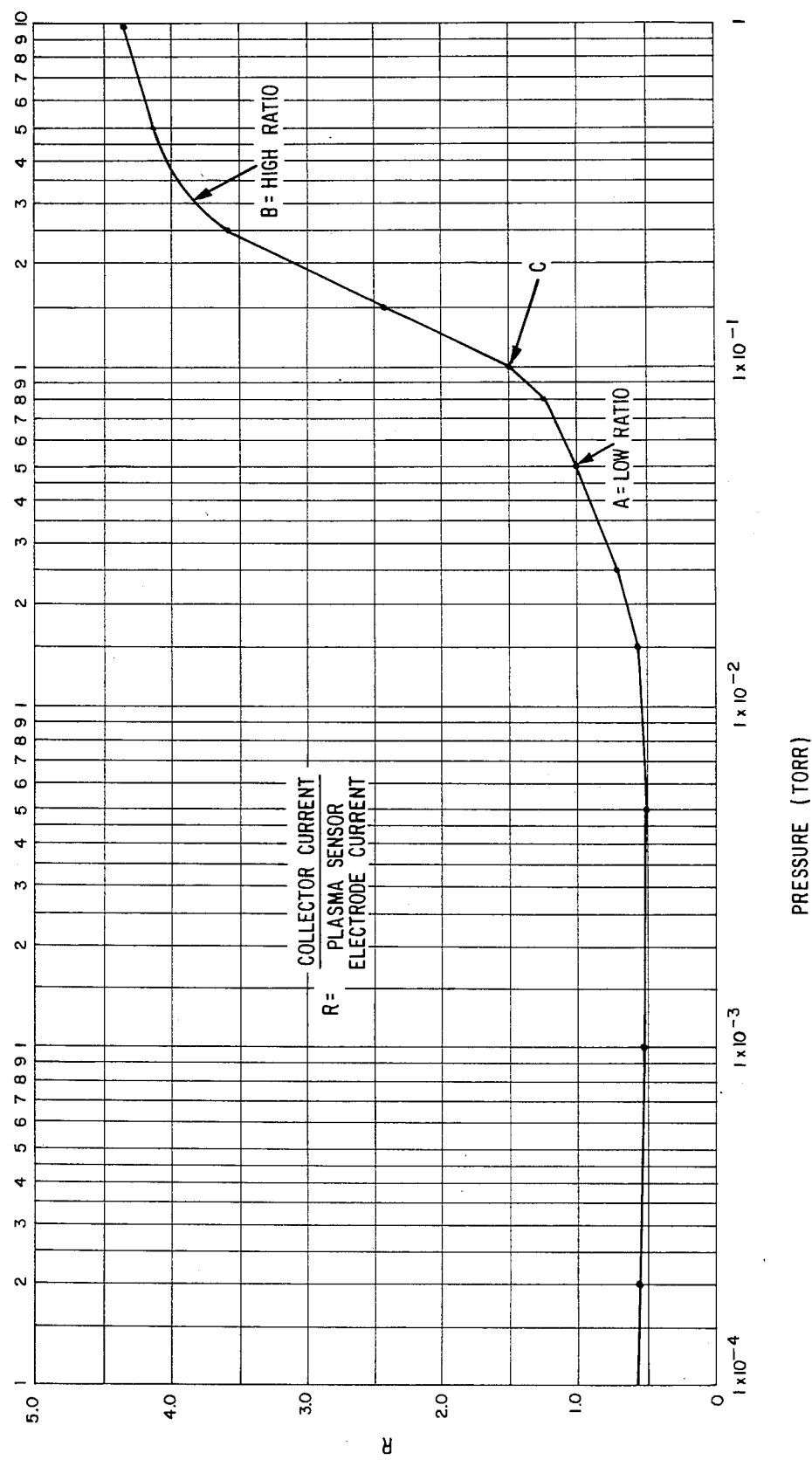
FIG. 10 is a graph illustrating the ratio of collector current to plasma sensor electrode current with respect to pressure in the system of FIG. 7.

As can be seen in FIG. 9, the collector current increases with increasing pressure up to about $10^{-1}$ torr, at which pressure this current decreases. Thus, a particular reading of collector current in a conventional gauge will not be unambigious, if the measurement range is extended from point d to e. For example, a collector current of 1 milliamp corresponds both to a pressure slightly greater than $10^{-2}$ torr and a pressure of about $6 \times 10^{-1}$ torr. To avoid this ambiguity and thus definitively establish which side of the collector current curve the system is in, the plasma sensing electrode 42 is employed in accordance with the invention. This sensor senses the presence of plasma 34b outside grid 20 and generates a current through sensor resistor 44 proportional to the amount of plasma 34a coupled from the grid 20 to ground 32 of the vacuum chamber. As can be seen in FIGS. 9 and 10, the ratio R of the collector current to the plasma sensor electrode current varies with pressure. In particular, this ratio is about ½ up to pressures slightly greater than $10^{-2}$ torr. At the point A in FIG. 9 (pressure about equal to $5 \times 10^{-2}$ torr), the ratio is 1. Thereafter, the ratio substantially increases until about the point B (pressure equal about $3 \times 10^{-1}$ torr ) where the ratio tends to approach a value of typically about 4.35. Thus, it can be seen that the ratio of collector current to plasma sensor electrode current can be utilized to determine which side of the collector current curve the system is operating in.

Referring to FIG. 8, voltages corresponding to the collector current, the plasma sensor electrode current and the ground current are respectively applied to terminals 50, 52 and 54. The voltages applied to terminals 50 and 52 are respectively amplified by amplifiers 56 and 58, the outputs of the amplifiers being applied to divider circuitry 60 which calculates the ratio R of the collector current to the plama sensing current. At pressures greater than $1 \times 10^{-1}$ torr, which is the peak of the collector current, R is greater than 1.50. This critical value of R, which is employed to determine which side of the collector current curve the system is operating in, is established at 62 which may be a voltage dividing network where the voltage corresponds to the critical ratio of R—that is, $R_c$. The measured value of R and $R_c$ are compared in a comparator 64. The output of comparator 64 is applied to a low pressure determination circuit 66 through an invertor 68 and directly to a high pressure determination circuit 70. Also applied to circuits 66 and 70 is the output of amplifier 56 via an analog to digital converter 73. The outputs of circuits 66 and 70 are applied to a read out device 72 which provides a reading of the measured pressure.

In operation this portion of the FIG. 8 circuitry measures the value of the pressure of 1 torr for example, in the following manner. As can be seen in FIG. 10, R is greater than $R_c = 1.5$ when the pressure is 1 torr. Thus, the output from comparator 64 will be positive whereby an enable signal is applied to high pressure determination circuit 70 and a disable signal is applied to low pressure determination circuit 66. Each of the circuits 66 and 70 may, for example, comprise an EEPROM where the addresses thereof correspond to the digitized, collector current output of analog-to-digital convertor 73. Stored in each of the locations of memories 66 and 70 are pressure values corresponding to associated collector current values. Thus, as can be seen in FIG. 9, a pressure of 1 torr corresponds to a collector current of 500 microamperes. The value of 500 is used as an index to address the enabled memory 70 at a particular address location thereof, the value of 1 torr being stored at that address. Accordingly, circuit or memory 70 outputs the value of 1 torr to readout device 72 whereby the pressure reading is displayed. As can be seen, the range of the gauge is substantially extended beyond the point d limit of typical gauges. Moreover, this has been effected without applying any oscillating voltages of the electrodes of the gauge.

If the pressure is less than $10^{-1}$ torr, say for example about $6 \times 10^{-3}$ torr, the collector current will again be about 500 microamps. Again, this value will be used as an index for addressing memory. However, since the value of R at $6\times10^{-3}$ torr is about $\frac{1}{2}$, which is of course less than the critical ratio, $R_C$ of 1.5, the low pressure determination memory 66 rather than the high pressure memory 70 will be enabled. Accordingly, the collector current value of 500 microamps is now used as an index to address a particular memory location of memory 66 rather than memory 70. Stored in this location of memory 66 is the pressure $6\times10^{-3}$ torr and accordingly this value is read out into display 72 when this memory location is accessed.

From the foregoing it can be seen plasma sensor 42 enables unambiguous detection of the pressure regardless of which side of the collector current curve the system is operating in. In general, by providing a signal which is a function of the plasma coupled from the grid to the vacuum chamber walls, plasma sensing electrode 42 can be combined with another ion detecting electrode such as collector 36 whereby a ratio of the two ion detecting electrode currents may be calculated to determine which side of the collector current curves the system is operating in.

The critical ratio, $R_C$, depends upon gauge design. Thus, it becomes an additional parameter that is reported to gauge user—just as gauge sensitivities for various gases are presently reported. As indicated above, if the ratio R is not used, the gauge should be set to turn the electrometer off at point d in FIG. 9. Three more decades of higher pressure measurement are possibly if the ratio is used. In fact, the upper limit occurs when emission can no longer be accurately maintained.

Plasma sensor 42 can be any configuration from a straight wire to a can about the grid structure 20. its potential can be near ground. Such an electrode can be used in several ways to sense the plasma. It will rise in voltage to near the grid, if floating. If held near ground, it will achieve significant current flow, depending upon its area. As an alternate method of sensing the plasma, two small adjacent electrodes (not shown) could be ac or dc driven, and the current sensed. Conductivity between them will increase with increasing plasma density. Thus, there are several elementary ways to sense the plasma level in the gauge, independent of measuring the conventional ion current.

There have been a number of commercial BA type ionization gauge tubes that have had grounded shields coated on their glass enclosures. To the best of applicant's knowledge, none of these used the shield for other than stabilizing the environment. However, it would be possible to use the grounded shields of these gauges to sense plasma and to keep them at ground potential to minimize noise at the same time. FIG. 7 shows one possible physical arrangement of electrodes in a modification of the BA type tube, which may also be used in accordance with the invention.

Referring again to FIG. 8, the remaining circuitry thereof is utilized to de-energize controller 22 if an open ground condition is detected between chamber 14 and its ground 32 or, for that matter, anywherein the ground circuit including controller chassis ground 30 and chamber ground 32. Generally, this is effected by noting in FIG. 9, at pressures above $5\times10^{-4}$ torr and below $5\times10^{-1}$ torr, substantial ground current occurs which is potentially dangerous. Thus, once a pressure measurement has been made in accordance with the above described circuitry of FIG. 8, a further determination is made in accordance with the invention to determine if the ground current corresponds to the measured pressure. Thus, at a pressure of $10^{-2}$ torr, the ground current through resistor 41 should be about 300 microamps. However, if an open ground condition exists, the current will be substantially zero. Hence, if the circuitry of FIG. 8 does not detect a ground current of about 300 microamps upon detecting a pressure of $10^{-2}$ torr, the controller 22 will be de-energized. If an open ground circuit does exist, and an operator establishes a path between the chamber walls and ground, this 300 microamps would flow through him and would be potentially lethal in the absence of the ground fault detecting system of the present invention.

The circuitry of FIG. 8 for implementing the foregoing may include a digital-to-analog converter 77 for converting the pressure reading from either circuit 66 or circuit 70 to an analog reading which is applied to the + terminals of comparators 76 and 78. Applied to the − terminals of these comparators are reference voltages from potential dividing network 80 which includes a voltage source 82 and potential dividing resistors 84 through 88. The voltage applied to the − terminal of comparator 78 from resistor 88 may correspond to the pressure $5\times10^{-4}$ torr while the voltage applied to the − terminal of comparator 76 from resistor 86 may correspond to $5\times10^{-1}$ torr, this range of pressures having corresponding ground currents which may be dangerous as discussed above. The outputs of comparators 76 and 78 are applied to an exclusive or circuit 90, the output of which is applied as an enable signal to a ground current determination circuit or memory 92. Also applied to determination circuit 92 is the digital output of either circuit 66 or circuit 70, depending on which one has been selected, the outputs of these circuits being applied over line 94. The pressure value applied over line 94 functions as an index to address a memory location within circuit 92 in the same manner circuits 66 and 70 are addressed. That is, circuit 92 may also comprise an EEPROM having stored therein ground current values which respectively correspond to associated corresponding pressures such as those shown in FIG. 9. Thus the output of circuit 92 is the ground current which should be passing through resistor 41 when the pressure within the gauge corresponds to that displayed at readout 72.

The digitized, ground current value read from circuit 92 is applied to a digital-to-analog convertor 96 and thence to a voltage dividing network including resistors 98 through 102. The voltages occurring at resistors 100 and 102 are respectively applied to the − terminals of comparators 104 and 106. Also applied to the + terminals of these comparators is the voltage occuring at terminal 54 corresponding to the ground current sensed at resistor 41, this voltage being amplified by amplifier 108. The outputs of the comparators are applied to an exclusive or circuit 110 and thence through an invertor 112. The output of invertor 112 is applied to a gate 114 (FIG. 7) in the emission current loop to de-actuate controller 22 if an abnormal ground current condition exists.

Figure 5:
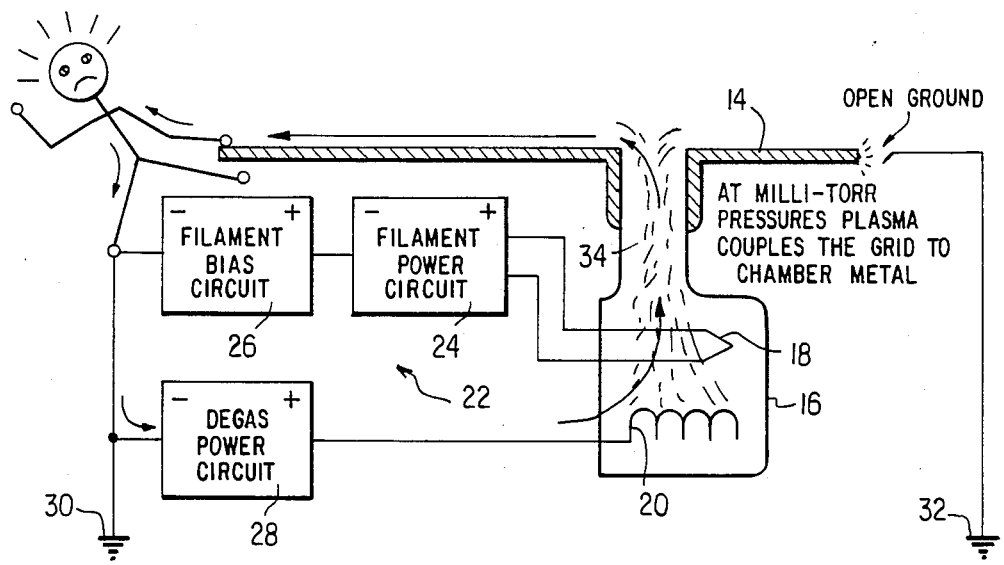
FIG. 5 is a schematic diagram which illustrates the potentially lethal problem associated with prior art ionization gauge systems.
Figure 6:
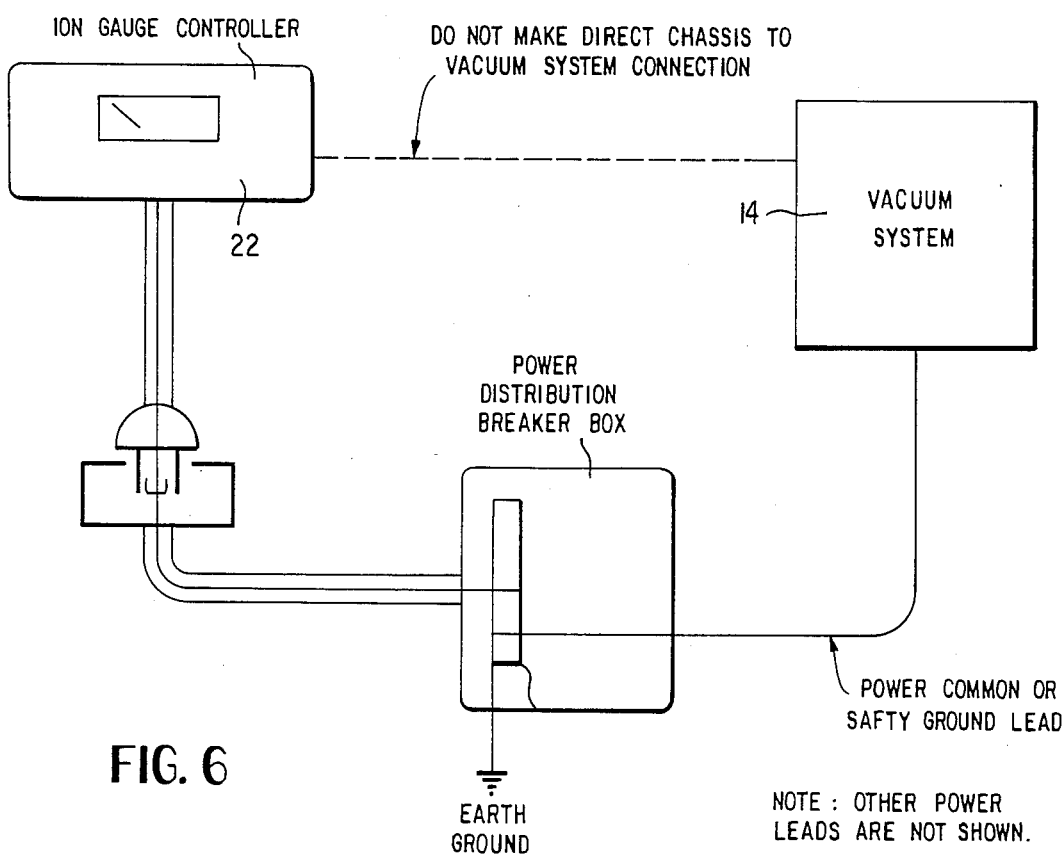
FIG. 6 is a schematic diagram which illustrates further problems associated with conventional prior art ionization gauge systems.

In operation, the circuitry of FIG. 7 processes a ground fault in the following manner. Assume, the ground 32 is disconnected from chamber 14, as shown in FIG. 5. Also assume the measured pressure, as displayed at readout 72, is $10^{-2}$ torr. With the ground circuit intact, the ground current should be about 300 microamps, as can be seen in FIG. 9. However, due to the open circuit condition, the ground current will fall to practically zero. The pressure of $10^{-2}$ torr, as determined at determination circuit 66 is applied to digital-to-analog converter 77 where it is converted into an analog voltage and applied to comparators 76 and 78. The voltage across resistor 88 corresponds to a pressure of $5 \times 10^{-4}$ torr and thus the voltage applied to the + terminal of comparator 78 is greater than that applied to the − terminal. Accordingly, comparator 78 applies a positive signal to exclusive or circuit 90. Moreover, since the voltage applied to the − terminal of comparator 76 corresponds to a pressure of $5 \times 10^{-1}$ torr, it will be greater than the voltage applied to the + terminal, the latter voltage, of course, corresponding to the measured pressure of $10^{-2}$ torr. Thus, the output of comparator 76 is negative and the exclusive-or function of circuit 90 is satisfied to thus provide an enable signal to ground current determination circuit 92. Note if the measured pressure were less than $5 \times 10^{-4}$ torr or greater than $5 \times 10^{-1}$ torr, the exclusive or function of circuit 90 would not be satisfied and the ground current determination circuit would be disabled. As stated above, pressures below or above the range established by comparators 76 and 78 and exclusive or circuit 90 are not considered dangerous and thus controller 22 would not be de-energized under these conditions.

Assuming again, the measured pressure is $10^{-2}$ torr, the 300 microamp value of ground current stored at the memory location of circuit 92, whose address corresponds to the digitized value of the $10^{-2}$ pressure reading applied over line 94, is applied to digital-to-analog convertor 96. The output of the convertor 96 is applied to a comparator window circuit including a voltage divider 97 having resistors 98, 100 and 102 where the voltages across resistors 100 and 102 are respectively applied to the − terminals of comparators 104 and 106. The purpose of the comparator window is to generate a de-actuate signal for controller 22 whenever the sensed ground current differs by more than ½ of a decade from what the ground current should be for a given gauge pressure. Thus, the values of resistors 100 and 102 are so chosen so that the voltage applied to the − terminal of comparator 106 may be ½ decade below the ground current value outputted from determination circuit 92 while the voltage applied to the − terminal of comparator 104 from resistor 100 may be ½ of a decade greater than the outputted ground current value. Assuming the voltage applied to terminal 54 corresponding to the sensed ground current is within the range established by comparators 104 and 106 and exclusive or circuit 110, a positive output signal will be outputted from the or circuit 110 and then inverted by the invertor 112 whereby the gate 114 in the controller will not be opened and thus the controller will not be de-energized. If the sensed ground current is more than + or −½ of a decade greater or less than what it should be for the measured pressure, the output from the or circuit 110 will be negative. This signal will in turn be inverted by the invertor and applied as a positive signal to gate 114 to de-energize controller 22.

From the foregoing it can be seen the circuitry of FIG. 8 will de-energize controller 22 whenever the ground current is abnormal—that is whether it is greater than or less than a predetermined amount from its expected value. Thus, the circuit is not only sensitive to the open ground condition where no current flows but also to other conditions where excessive ground current would flow.

It should be noted that the determination circuits 66, 70 and 92 need not be digital in nature, That is, they could also operate on an analog basis where the input thereto would be converted to a predetermined output in accordance with an equation relating the input and output. Thus, for example, referring to the low pressure determination circuit 66, the analog-to-digital convertor 72 could be eliminated and the analog value of the signal representing the collector current could be converted to another analog signal representing the pressure corresponding to that collector current in accordance with an algebraic equation determined from the collector current curve of FIG. 9.

Moreover, the principles of the present invention may also be employed in conventional gauge controllers where the electrometer is turned off at point d of FIG. 9. In this case, it is known any pressure exceeding a predetermined minimum ($5 \times 10^{-4}$ torr, for example), is capable of generating ground currents of a potentially dangerous magnitude since the system operation is only on the left side of the collector current curve. Accordingly, the pressure may be conventionally measured with an electrometer circuit and applied to the + terminal of a comparator 116 of FIG. 11 from a terminal 115. Also applied to comparator 116 is a reference voltage corresponding, for example, to the $5 \times 10^{-4}$ pressure which must be exceeded before possibly dangerous ground currents flow, the reference voltage being applied from a potentiometer 118 which includes a voltage source 118a. A voltage coresponding to the ground current sensed through resistor 41 is applied to the + terminal of a second comparator 120 while applied to the − terminal thereof is a voltage from a voltage source 122a through a resistor 122, which voltage corresponds generally to the ground current which should flow when the minimum pressure of $5 \times 10^{-4}$ torr occurs. Typically, as stated above, this current is about 24 microamps while the voltage value established at reference voltage source 122 may be about one-half of a decade lower—that is, about 19 microamps to take into account gauge variations. The output of comparator 116 is directly applied to one input of an exclusive or circuit 124 while the output of comparator 120 is applied to the other input of the exclusive or circuit through a gate 126, the gate being conditioned by the output signal from comparator 116. The output of circuit 124 is applied to gate 114 of controller 22 of FIG. 7 to de-energize the controller whenever insufficient ground current is sensed for pressure readings above $5 \times 10^{-4}$ torr thereby indicating the probability of an open ground condition.

In operation, assume the pressure reading applied to the + terminal of comparator 116 is less than the minimum pressure of $5 \times 10^{-4}$ torr where potentially dangerous ground currents can occur. Accordingly, this is a non-dangerous condition. The output from comparator 116 will be low and thus gate 126 will be disabled so that two low voltages will be applied to exclusive or circuit 124. Accordingly, the output of circuit 124 will also be low and no de-energization of the controller will occur.

Assume next the pressure exceeds $5 \times 10^{-4}$ torr whereby a positive output from comparator 116 will be applied to both the exclusive or circuit 124 and gate 126. If the output of comparator 120 is positive at this time, the positive output will also be applied to exclusive or circuit 124 whereby again the conditions of circuit 124 are not satisfied since both inputs thereto are high and thus, there will be no controller de-energization. The output of comparator 120 will be positive whenever the sensed ground current exceeds the reference ground current of 19 microamps established at reference voltage source 122a. Hence, the ground current should exceed 19 microamps before the pressure reaches $5\times10^{-4}$ torr. Note the purpose of gate 126 is to prevent the establishment of a condition satisfying the exclusive or circuit 124 when the sensed ground circuit exceeds 19 microamps since this may occur prior to the pressure reaching $5\times10^{-4}$ torr. Thus, the gate 126 effectively senses whether the ground current has exceeded 19 microamps after the pressure exceeds $5\times10^{-4}$ torr.

Of course, if the ground current is less than 19 microamps at the time the pressure exceeds $5\times10^{-4}$ torr, a high level signal will be applied to the exclusive or circuit from comparator 116 while a low level signal will be applied from comparator 120 through gate 126. Thus, the conditions for satisfying the exclusive or 124 are present whereby a positive signal is applied to gate 114 to de-energize controller 122.

As stated above, the circuitry of FIG. 8 is responsive to abnormalities in the ground current where the ground current is substantially greater or less than the expected ground current. However, if the only concern is with open ground conditions where the ground current is, of course, substantially less than that expected, it would be possible to simplify the circuitry of FIG. 8 eliminating ground current determination circuit 92 and all of the circuitry connected to its output and by further eliminating comparator 116 of FIG. 11 whereby the output of exclusive or circuitry 90 would be connected to exclusive or circuit 124 and gate 126 of FIG. 11 in place of comparator 116. Since an output occurs at exclusive or circuit 90 only in the pressure range where dangerous currents can flow, the foregoing modification of the circuitry of FIGS. 8 and 11 will detect an open ground condition whenever the ground current is substantially less than what is expected for the pressure range established by comparators 76 and 78.

Another simplification of the circuitry of FIG. 8 is possible by having low pressure determination circuit 66 and high pressure determination 70 each store both the pressure and ground current expected for each collector current value. That is, each location of circuits or memories 66 and 70 would contain not only the pressure expected for a given collector current, but also the expected ground current, these expected values being determinable from FIG. 9 in a manner corresponding to that described above with respect to the collector current-pressure relationship. In such a modification of FIG. 8, ground current determination circuitry 92 together with the comparator window circuitry including comparators 76 and 78 and exclusive or circuit 90 can be eliminated. Thus, the ground current outputted from either memory 66 or 70 for a particular collector current value would be applied directly to digital-to-analog converter 96 to determine if the ground circuit is functioning normally.

Figure 11:
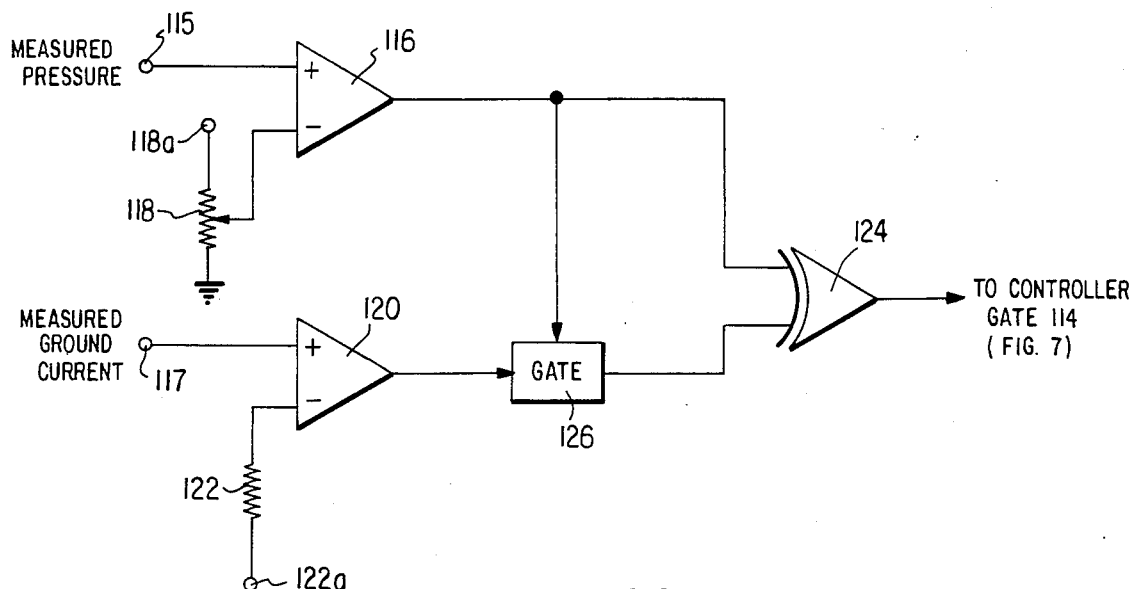
FIG. 11 is a block diagram of illustrative circuitry for improving the safety of a conventional ionization gauge.

Referring to FIG. 11, a further possible modification thereof would consist of simply applying the collector current value to the + input of comparator 116 while the reference voltage established at potentiometer 118 would be about 95 microamps of collector current. Thus, any time the collector current exceeded 95 microamps, the ground current should be at least 19 microamps. The foregoing modification can also be applied to the extended range system of FIG. 8 where the collector current would be applied to a comparator window, the range of the window corresponding to those collector currents where potentially dangerous ground current can flow. The collector current window would then be used in place of the comparator 116 where its output would be applied to exclusive or circuit 124 and gate 126. Of course, the collector current window would comprise two comparators and an exclusive or circuit as has been the case in the comparator windows described above.

Figure 12:
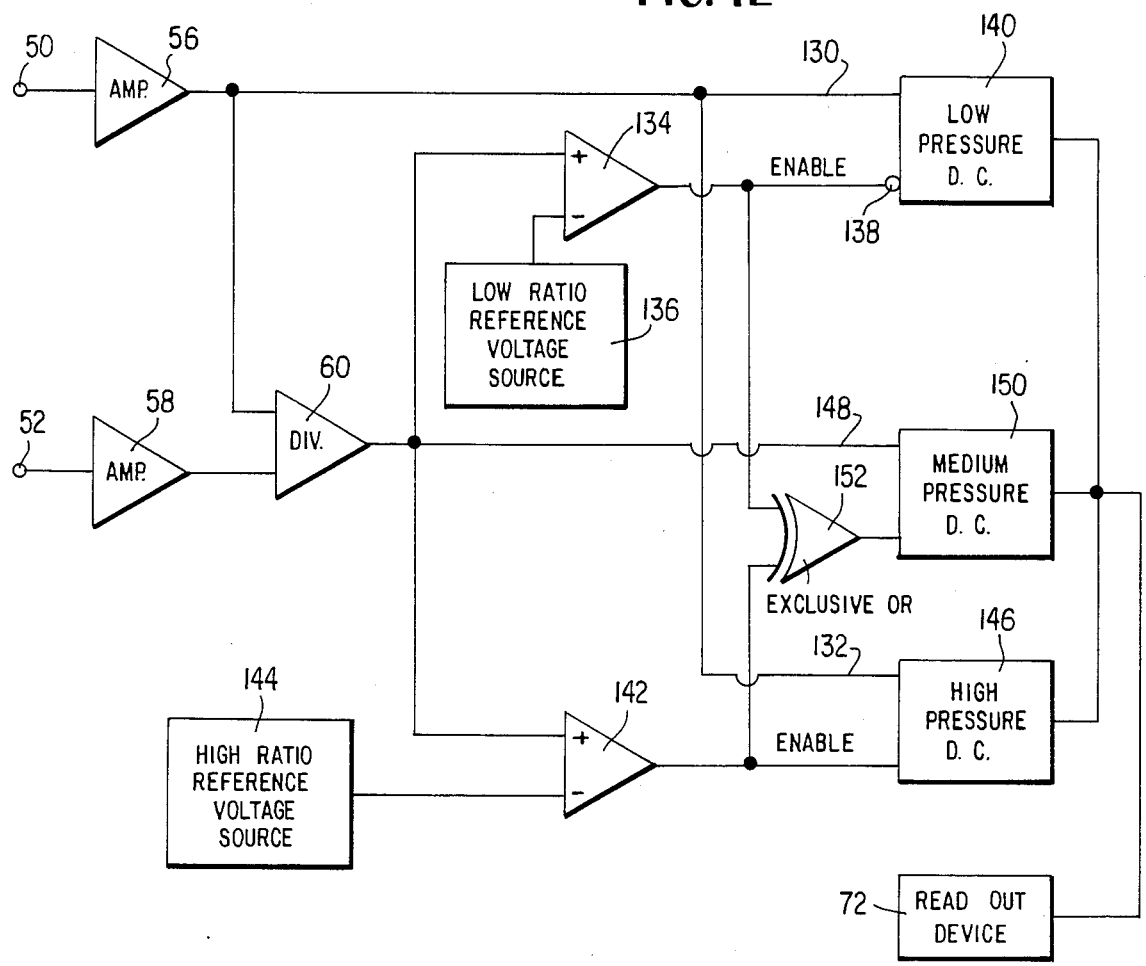
FIG. 12 is a modification of the circuitry of FIG. 8 for improving the accuracy thereof.

Reference should now be made to FIG. 12 which illustrates a further modification to the circuitry of FIG. 8. Referring to FIG. 9, it should be noted the collector current reading is relatively flat between the pressures $A=5\times10^{-2}$ torr to $B=3\times10^{-1}$ torr. Hence, there is some difficulty in obtaining accurate pressure (and ground current) readings over this mid-range of the collector current. However, referring to FIG. 10, it can be seen the ratio R is reasonably steep in the region of pressure where the electrometer reading is relatively flat. Accordingly, in the cricuitry of FIG. 12, the ratio R is used as a pressure signal in the above range to achieve a more reliable and accurate pressure measurement in this range.

In particular, the circuitry of FIG. 12 includes, in addition to the circuitry of FIG. 8, a comparator 134 having the output of divider 60 connected to the + terminal thereof and a low ratio reference voltage source 136 connected to the − terminal thereof, the low ratio typically being 1 as shown at point A in FIG. 10. The output of the comparator 134 is connected to the inverting input 138 of a low pressure determination circuit 140. A second comparator 142 also has its + terminal connected to the output of divider 60 while connected to the − terminal thereof is a high ratio reference voltage source 144, this ratio typically being about 3.85 as indicated at point B in FIG. 10. The output of comparator 142 is applied as an enable signal for a high pressure determination circuit 146.

The output of divider 60 is also applied over line 148 as an index or addressing signal for a medium pressure determination circuit 150. The enable signal for circuit 150 is derived from an exclusive or circuit 152 whose inputs are respectively connected to the outputs of comparators 134 and 142. Index or addressing signals for circuits 140 and 146 are applied from amplifier 56 over lines 130 and 132 respectively.

In operation, first assume the ratio R is less than 1 thereby indicating a pressure reading of less than $5\times10^{-2}$ torr. Accordingly, the outputs from comparators 134 and 142 will be low whereby circuit 140 will be enabled due to the inversion effected by the inverting input 138. Circuit 146 will not be enabled since the enable signal thereto is low. Moreover, circuit 150 also will not be enabled because both of the inputs to exclusive or circuit 152 are low whereby the enabling output of circuit 152 will also be low. Thus, the collector current values applied over line 130 are used to index or address determination circuit 140 in the same manner as circuit 66 is indexed, as described above, to derive low pressure readings for application to read out device 72. The outputs from determination circuits 140, 146 and 150 are also applied to digital-to-analog convertor 77 and circuit 92 of FIG. 8.

Assuming the pressure is greater than $5\times10^{-2}$ torr but less than $3\times^{-1}$ torr, the output of comparator 134 will go high thus disabling circuit 140 while the output of comparator 142 will remain low whereby circuit 146 will continue to be disabled. However, the conditions for satisfying exclusive or circuit 152 are present and thus, the circuit 150 is enabled. As can be seen from FIG. 10, the values of R correspond to particular pressure readings and thus the values of R are used as an index to address to address memory 150 and thus determine the pressure for the particular value of R applied from divider 60 through an analog-to-digital converter (not shown) to circuit 150. Due to the steepness of the R curve in the mid-range of pressures, it can be seen more accurate pressure measurements are obtainable with the circuitry of FIG. 12 in this range.

When the pressure exceeds $3 \times 10^{-1}$ torr, the outputs of comparators 134 and 152 are both high thus disabling circuit 140 and exclusive or circuit 152 while enabling circuit 146. Circuit 146 functions in exactly the same manner as described above for circuit 70 to provide readings in the high pressure range.

Figure 13:
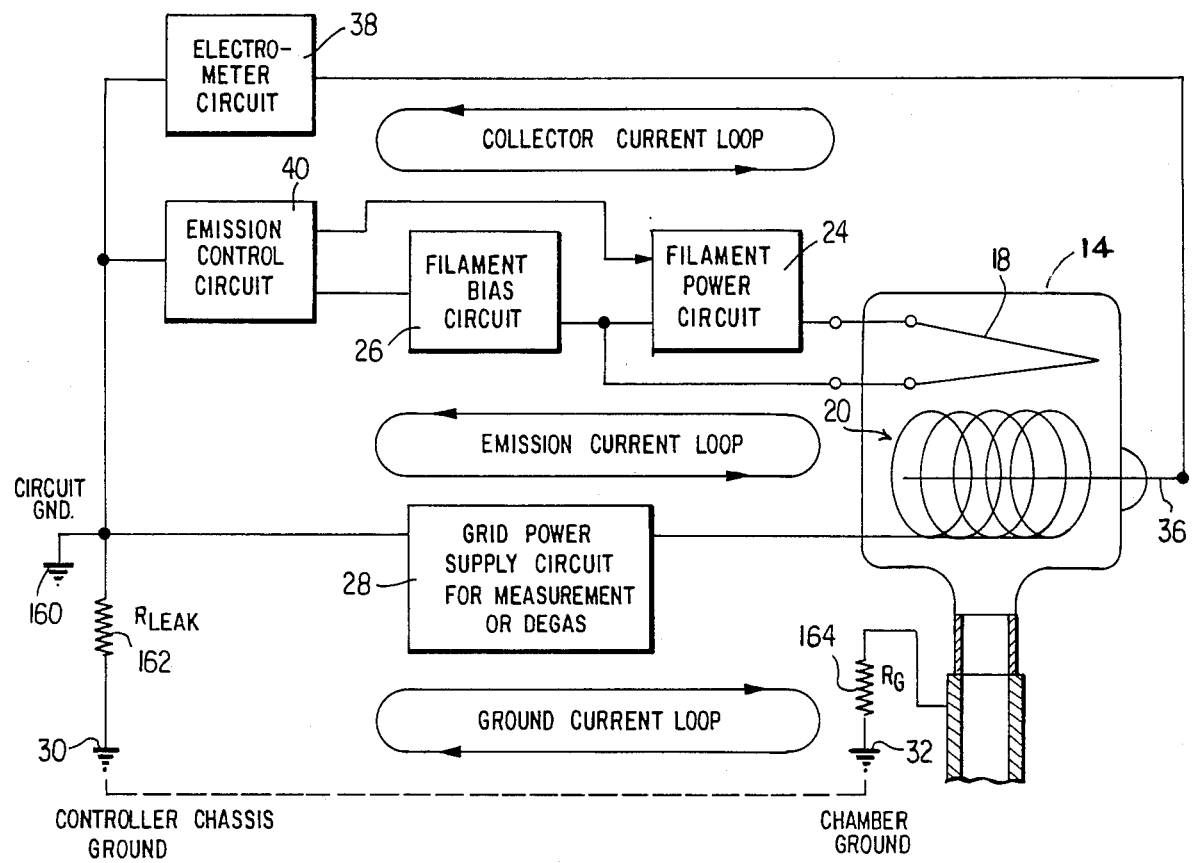
FIG. 13 is a schematic diagram of another embodiment of an ionization gauge system in accordance with the invention.

Reference should be made to FIG. 13 which illustrates a further embodiment of the invention. In the embodiments of FIGS. 7 through 12, the ground of the controller circuitry 38 is in common with the ground 30 of the chassis. In the embodiment of FIG. 13, the controller circuitry and electrometer circuitry 38 are floated with respect to the chassis ground 30. Thus, the ground 160 of the controller 22 is effectively separated from the ground 30 of the chassis by a leakage resistance 162, this generally being a very high impedance of typically $10^7$ ohms. If an operator were to touch the controller chassis ground 30 and an ungrounded chamber 14 (assuming the ground 32 has inadvertently become disconnected from chamber 14), there would be the $10^7$ ohm impedance of leakage resistance 162 of series with the operator. Even if the impedance of the operator was near zero (wet palm to wet palm), he would draw only 1,000 volts/$10^7$ ohms=0.1 milliamps of current. This is reportedly safe. As will be described below, the chamber will charge to about 1,000 volts and thus the foregoing calculation of 0.1 milliamps results.

Figure 14:
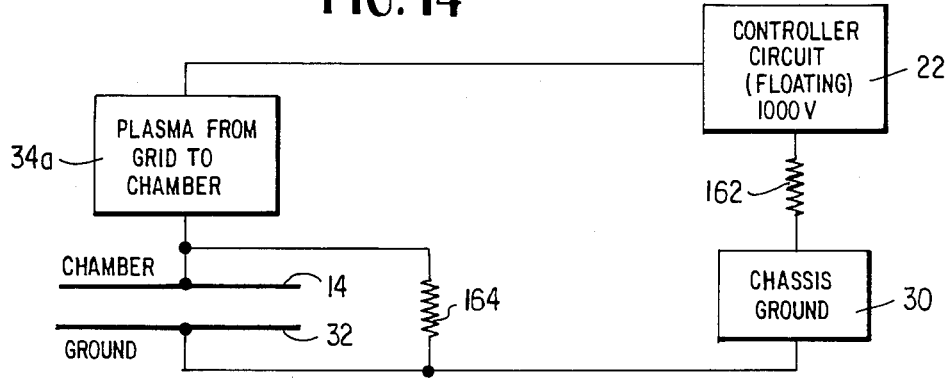
FIGS. 14 and 15 are equivalent circuits of the system of FIG. 13.
Figure 15:
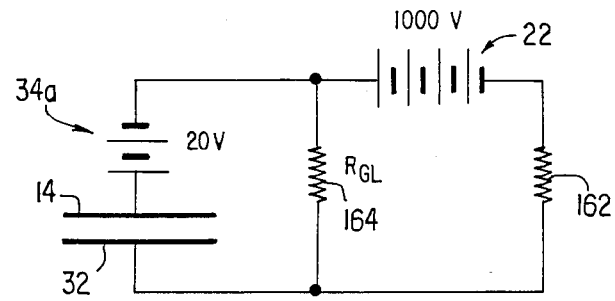

As can be appreciated from the foregoing, the ground current is substantially reduced by floating the internal circuitry with respect to chassis ground 30, this reduction occuring regardless of whether the chamber is appropriately grounded or not. However, consideration must also be given to the fact that the chamber can typically charge to about 1,000 volts if it becomes disconnected from its ground 32. Referring to FIGS. 14 and 15 there are shown equivalent circuits of the system of FIG. 13 when chamber 14 is disconnected from ground 32. The area/separation calculation needed to determine the capacitance between chamber 14 and ground is difficult to calculate—even when the geometry is known. A typical moderate sized chamber 14 is calculated to have a capacitance to ground of about 5 pf. If there were infinite leakage impedance to ground, this capacitance would charge to about 1,000 volts. The Coulombs of energy in the capacitor would be $\frac{1}{2} V^2 C = 2.5 \times 10^{-6} C$. If this capacitance were discharged over 0.01 seconds, the average current would be 0.25 milliamps. It is the understanding of applicant that 0.5 milliamps at high voltage would be sufficient to cause problems such as fibrillation. If the discharge time were less than 0.005 seconds the current would be higher than 0.5 milliamps. However, based on applicant's present understanding, the average current during discharge of the capacitor (that is, if an operator were to touch the controller chassis and ground 32 (or ground 30), this would effect discharge of the foregoing capacitance between the chamber and ground), the currents flowing would be less than those which would be considered dangerous. However, due to the foregoing capacitance effect, the embodiments of FIGS. 7 through 12 are preferred.

In spite of the foregoing capacitive effect, it should also be noted that when the chamber 14 becomes ungrounded, the resistance 164 changes from about 0.1 ohms, when correctly grounded, to about $10^7$ ohms when ungrounded. Thus there is a finite ground leakage impedance 164 which drains charge off the capacitor established between vacuum chamber 14 and ground. If this ground leakage resistance were less than the $10^7$ ohm resistance 162 between circuit ground 160 and chassis ground 30, the voltage on the chamber 14 would be less than that at controller circuit 22 and thus would be less dangerous.

Other preferred embodiments for implementing the ground safety features of the present invention are illustrated in FIGS. 17-23. These embodiments are based on the principle that danger to the operator is created by plasma such as plasma 34a of FIG. 7, which is generated outside grid (or anode) 20 or by plasma which flows out of gauge 16 to the chamber. Accordingly, the gauges of FIGS. 17 through 23 minimize the opportunity for plasma generation external to the grid or for plasma leakage.

Referring to FIG. 16 there is diagrammatically illustrated a gauge disclosed in U.S. application Ser. No. 497,581, this application being incorporated herein by reference. This gauge is primarily characterized by a solid grid 170 the lower portion of which is cylindrical and the upper portion of which is hemi-spherical, rather than the conventional wire grid anode 20 of FIG. 7. Small holes 174 are provided in anode 170 for pressure equilibrium with the vacuum chamber 14. A narrow, circumferential slit 176 is provided around at least a portion of anode 170. A semicircular, ribbon-like filament 180 is concentrically disposed with respect to anode 170 and ejects electrons into the anode. A pair of semi-circular focusing electrodes or guard rings 178 are disposed above and below filament 180 where the focusing electrodes extend slightly beyond the opposite ends of the filament. The filament is connected to the controller by lines not shown and the focussing electrodes 178 are typically electrically connected at the centers thereof to the center of the filament by lines also not shown. The collector 181 is disposed near the floor of the chamber established by the anode 170, the collector being connected to the electrometer circuitry via line 183.

In brief, the characterizing features of the FIG. 16 gauge are as follows; (1) Substantially all of the electrons emitted by filament 180 enters the ion collection volume defined by closed anode 170. (2) The path length and energy of each electron is substantially independent of the point of origin of the electron on filament 180. (3) The number of transits of all of the electrons through the ion collection volume is preferably constrained to a constant number and, in particular, one transit. (4) The ion collection efficiency at collector 181 is preferably substantially independent of the point of origin of the emitted electrons on filament 180. (5) Furthermore, the gauge preferably operates with existing ionization gauge controllers.

As can be appreciated, the configuration of FIG. 16 tends to confine plasma generation within the grid 170. In fact, this configuration does result in substantially less plasma current than the classical BA ion gauge tube. However, this reduction is still insufficient—especially at the pressures and ground currents present during the degas mode.

However, in accordance with a further aspect of the invention, the gauge of FIG. 16 can be rendered safe at all working pressures of the gauge by implementing certain modifications thereof as illustrated in FIGS. 17(a) through 17(e). Thus, in FIG. 17(a), the area behind filament 180 is closed with a ceramic cap 188 supported by upper and lower ceramic sleeves 182. The wires for the filament may be taken through the ceramic cap. Moreover, as shown in FIG. 17(a), a screen 184 connected to support 172 may be provided to extend over and enclose the holes 174 to further confine plasma generation within anode 170.

Alternatively, as shown in FIG. 17(b), screens 186 may be directly applied over openings 174 to effect plasma confinement. Furthermore, as shown in FIG. 17(c), a metallic cap 190 rather than ceramic cap 188 may also be used to close the area behind filament 180.

Referring to FIG. 17(d), the ceramic sleeves 182 of FIG. 17(a) are shown in more detail and in particular the slots 192 formed therein. Basically, the purpose of slots 192 is to maintain electrical isolation between focusing ring 178 and anode (or grid) 170. In particular, sputtering of a metallic coating will tend to occur on the exposed surfaces of sleeves 182. However, due to the narrow width of slots 192, it is highly improbable that the coatings will extend all the way to the bottoms 193 of the slots. Hence, the coatings will not establish a conductive link between guard rings 178 and the anode 170.

Referring to FIG. 17(e), a modification of the FIG. 17(d) embodiment is illustrated wherein slots 192 include vertical portions 195. Thus, the probability of sputtered coatings establishing a conductive link between anode 170 and focusing electrode 178 is even further reduced in view of the extremely low probability of such coatings extending to the bottoms of vertical portions 195 of slots 192 and then back up to focusing electrodes 178.

Assuming ceramic sleeves 182 are not enclosed by a cap such as cap 188 of FIG. 17(a), slots 194 with vertical portions 197 may be provided at the other end of focusing electrode 178. Although not shown in FIG. 16, the structure illustrated therein may be enclosed in a metal tube or the like. When the embodiment of FIG. 17(e) is employed, the ends of ceramic sleeves 182 including slots 192 would be attached to anode 170 as illustrated in FIG. 17(a). The ends of ceramic sleeves 182 including slots 194 would face but not contact the above-mentioned metal tube to insure that the metal tube does not short out to focusing electrodes 178. Slots 194, with their vertical portions 197, function in the same way as slots 192 to further insure electrical isolation between the metal tube and the focusing electrodes.

In summary, with respect to the FIG. 17 modifications of the FIG. 16 gauge, the more these modifications are utilized, the more the plasma is isolated within the grid (or anode) 170 to thus minimize plasma current to the vacuum chamber and accordingly the dangerous ground currents discussed hereinbefore.

In the embodiments of FIGS. 16 and 17, the gauge design is such that plasma generation is substantially confined within the grid 170. In this manner plasma current to the vacuum chamber is minimized and thus potentially dangerous currents resulting therefrom are also minimized. In the embodiments of FIGS. 18 and 19, plasma generation is not confined within the grid 20. Thus, at pressures of 1 millitorr or more, plasma will be generated outside the grid. However, in the embodiments of FIGS. 18 and 19, means are taken to prevent the flow of this plasma to the vacuum chamber 14.

Thus, in FIG. 18, one or more screens 200, 201 may be placed in the line 203 connecting gauge 16 to chamber 14. The plasma is destroyed by contact with the screens. In order to force more plasma to screens 200, 201, bias may be placed on the screens by connecting the screens to the filament potential via a wire 202. The screens may also be connected to the filament by coating the inside 205 of gauge 16 with an electrically conductive material such a a metal where the coating would be connected to the screens and the filament. Moreover, the screens 200 may be floated or connected to any other source of similar potential. As a practical matter, the placing of a bias on the screens tends to be somewhat difficult and thus floating unbiased screens are preferable in some applications. The foregoing screening techniques would typically be used with a conventional BA tube.

Figure 19A:
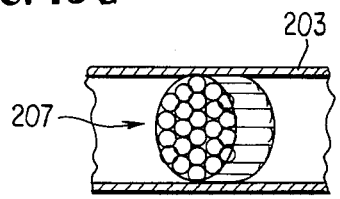
Figure 19B:
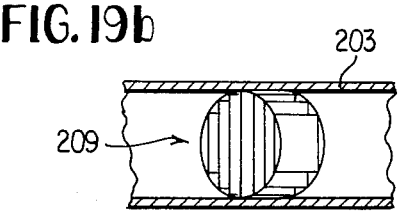
Figure 20:
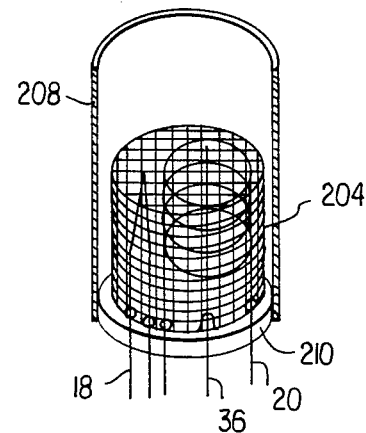

It is known to use screens such a screens 200, 201 to keep plasma from arc and sputtering operations from flowing into a gauge. However, the use of such screens to prevent flow of plasma in the opposite direction has not been employed. In particular in the present invention, screen 200 might employ a mesh of typically about 1/16 inch, while screen 201 might employ a mesh of typically about 1/32 inch, the spacing between the screens being about one-quarter of an inch. To keep plasma from flowing into the gauge, the screens would be reversed. Hence, the arrangement of screens in the present invention is novel. Moreover, a third one may be added. None of the screens in the present invention can be connected to chamber ground since, of course, this would provide a ready path to ground for the plasma. However, the screens may be connected to filament 18 or, preferably, left floating, as discussed above. In the reverse situation where plasma has been prevented from entering the gauge tube, the screens could be grounded; however, as stated above, in the application of the present invention, they must not be grounded. Hence, this provides a further distinguishing characteristic of the screens of the present invention. In operation the coarse screen 200 reduces the plasma intensity by furnishing recombination sites plus considerable conductance for gas flow. The finer screen 210 establishes a sheath that prevents penetration and furnishes adequate sites for the remaining combination. In the embodiment of FIGS. 18 and 20, the BA gauge 16 is in a glass tube and is made safer by the multiple screens in its neck 203. An alternative embodiment for use with a glass tube is illustrated in FIG. 19(a) where a pack of parallel, metal tubes 207 is mounted within glass neck 203. As shown in FIG. 19(b), parallel metal plates 209 mounted within neck 203 may also be employed. As can be appreciated from the foregoing, the object of the embodiments of FIGS. 18 and 19 is to force maximum ion/electron collision with a conductive surface while maintaining maximum gas flow conductance.

When the BA gauge is disposed within a metal tube as in a nude gauge implementation, the challenge to keep the plasma away from ground becomes greater. The BA type of gauge extends the electron path length by using an open grid such that the electrons can oscillate in and out of the grid on their way to being captured. To keep the ion generation inside the grid such as in the FIG. 17 embodiments is not meaningful in this type of gauge. Accordingly, in accordance with the embodiment of FIG. 20, there is provided a metal, isolation screen housing 204 around the entire gauge assembly, the assembly being disposed within metal tube 208 and the BA gauge including filament 18, grid 20 and collector 36 and being mounted on a ceramic base 210 or the like. Due to the disposition of the screen housing 204 outside grid 20, flow of plasma generated outside grid 20 to ground is prevented by the screen cage 204. The cage may be floated or connected to the filament in a manner similar to that illustrated in FIG. 18 or to an additional feed through pin (not shown) connected to a source of potential similar to that at the filament. In FIG. 21, an arrangement similar to that for FIG. 20 is shown for use in a glass tube.

The screen techniques of FIGS. 18–21 will keep the BA gauge itself free from plasma communication. The exact structure of the screen, or tubes, or fins, etc. is not critical. There should be sufficient surface and small enough dimension to keep the transmitted plasma to less than $\frac{1}{2}$ mA conductance.

From the foregoing, it can be seen the plasma coupling problem can be addressed in several ways. Thus, in the embodiments of FIGS. 7 through 12, the controller checks the ground current to de-activate itself when a dangerous ground current condition exists. In the embodiment of FIG. 13, the controller is isolated from ground to reduce the ground current; however, the possible charging of the vacuum chamber to a dangerous voltage may be a shortcoming. In the embodiments of FIGS. 17 through 21, various means are disclsoed by which plasma flow to ground is substantially prevented. It is this plasma flow which compromises operator safety. Hence, in the latter embodiments and in the embodiments to be described hereinafter, various means are employed to create the plasma needed for measurement only inside the non-grounded part of the gauge. Moreover, measures are taken to not let any of it get out of the gauge. Thus, in order to keep the plasma from contacting ground, it is kept within the gauge or destroyed on the way out.

Figure 22:
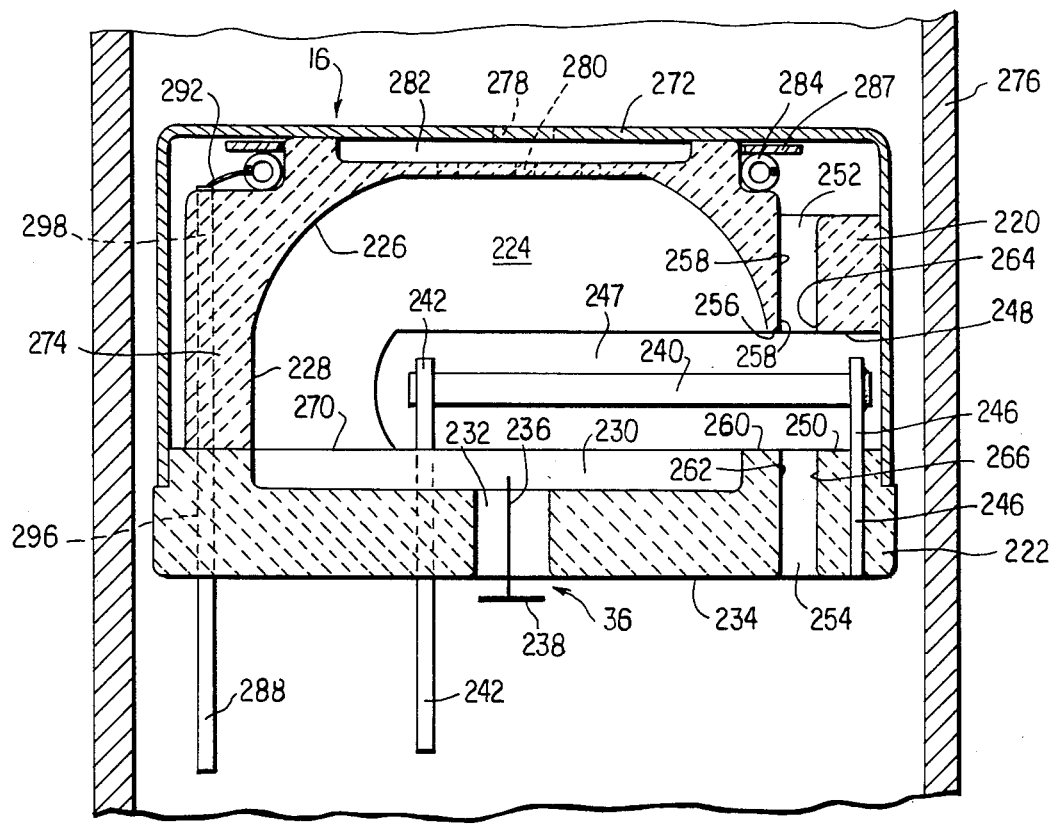
FIGS. 22 and 23 are cross-sectional and exploded views of a further ionization gauge in accordance with the invention.

In the next embodiments of the invention, there are disclosed different arrangements for effecting certain improvements of the gauges of FIGS. 16 and 17. In particular, referring to FIGS. 22 and 23, there is shown in cross-section and exploded views a gauge which is characterized by a two-piece ceramic support structure wherein all electrodes are coated into and onto the ceramic parts except the I$^2$R heater, filament and collector. In particular, the tube body for gauge 16 comprises an upper section 220 and a lower section 222. Each of these sections is made of ceramic or like material, the ceramic pieces being preferably fabricated by press-molding. As can be seen in FIG. 22, the upper section 220 includes a cavity 224, the upper portion thereof 226 being hemispherical in configuration while the lower section 228 thereof is cylindrical in configuration. The entire surface of cavity 224 is coated with a metal to fabricate the upper portion of the anode (or grid) of the gauge, the anode corresponding to anode 170 of FIG. 16. The lower section 222 has a cylindrical cavity 230 with a hole 232 extending through the base 234 of the lower section from cavity 230. The walls of cavity 230 and hole 232 are also coated with the anode metal to complete the anode structure. Preferably the anode metal is tungsten due to the low vapor pressure and high electrical conductivity thereof, although other suitable materials such as molybdenum may also be employed.

As can be seen in FIG. 22, the collector 36 may include a pin 236 having a disk or plate 238 connected to the bottom thereof, the pin being axially disposed within hole 232. Disc 238 provides the same ion collection function as the collector support in U.S. Pat. No. 4,307,323 granted to D. Bills, et. al., this patent being incorporated herein by reference. Preferably, disk 238 is disposed slightly below (typically about $\frac{1}{8}$ inch) the plane of face 234 while pin 236 extends slightly above (typically about $\frac{1}{8}$ inch). Means not shown may fixedly support the collector with respect to lower section 222. Such means may comprise any conventional support means such as a metallic bar extending from the lower face 234 of lower section 222 where the bar may in turn be connected to a pin for obtaining the collector current from the gauge.

The diameter of disk 238 is preferably slightly larger than the diameter of hole 232. Thus, the disk tends to capture any high energy ions which avoid hitting pin 236. Moreover, due to the disposition of disk 238 slightly below opening 232, the disk is shielded from X-rays which are generated upon electron impact with the anode coating on the wall of cavity 224. Moreover, due to the small diameter of pin 236, the probability of this element being struck by X-rays is also substantially reduced. Hence, the collector configuration of FIG. 22 is particularly advantageous in that it captures most if not all generated ions while at the same time only a very small number of X-rays strike it.

The filament 240 corresponds to filament 180 of FIG. 16 and is supported with respect to the lower section 222 by support pins 242 through 246. Current for the filament is applied to pins 242 and 244. The filament is welded or brazed to pins 242 and 244 at its ends and at its center to pin 246. The filament is typically comprised of thoriacoated iridium while the pins 242 through 246 are typically made of molybdenum.

A slot 247 is formed in the lower portion of the upper section, the slot extending slightly beyond the ends of filament 240. This slot corresponds to slot 176 of the FIG. 16 embodiment and thus permits the electrons emitted by filament 240 to enter into anode cavity. As can be seen in FIG. 22, the slot 247 is bounded at its lower edge by the upper surface of lower section 222.

Focusing electrodes or guard rings 248 and 250 are respectively formed on the lower surface of upper section 220 and the upper surface of lower section 222 adjacent filament 240, the focusing electrodes corresponding to the focusing electrodes 178 of FIG. 16. The focusing electrodes are also coated onto the cereamic upper and lower sections in the same manner as the anode, the coating material again preferably being tungsten.

Gaps 252 and 254 are respectively formed in upper and lower sections 220 and 222, gap 252 being formed between the anode surface of cavity 224 and focusing electrode 220 while gap 254 is disposed between the anode surface of cavity 230 and focusing electrode 250. Preferably, the anode coating of cavity 224 extends across surface 256 and slightly into gap 252 along surface 258. In a similar manner, the anode surface of cavity 230 extends across surface 260 and then slightly into gap 254 along surface 262 thereof. Moreover, focusing electrode 248 also extends slightly into gap 252 along surface 264 thereof while focusing electrode 250 extends slightly into gap 254 along surface 266 thereof.

Due to the foregoing arrangement, the gaps 252 and 254 solve a sputter coating problem that tends to occur in a gauge of the type illustrated in FIG. 16, as discussed above with respect to FIGS. 17(b) and 17(e). Thus, these gaps remove direct insulator contact between the anode surfaces of cavities 224 and 230 and the focusing electrodes 248 and 250. Since the sputtering problem tends to be most significant where the filament is operating and the anode is available to trap electrons, the gap is particularly effective in preventing the sputtering of a conductive link between the anode and focusing electrodes. Moreover, the gap is sufficiently narrow that plasma flow therethrough is not serious. Furthermore, due to the fact that the conductive coatings extend slightly into the gaps 252 and 254, as discussed above, the plasma trapping effect is enhanced to further reduce plasma flow through the gaps.

The most negative surface in a gauge is typically ground. Hence, the gauge in a grounded tube will be sputtered upon most severly if ions from the plasma can get to the grounded surface. The gap allows for sputtering on the filament support to be of little concern, for the only place the ceramic serves as an insulation between the filament/focusing electrodes and the anode is at the back 270 of the gauge, this area being well protected from the plasma.

The space in back of filament 240 may be enclosed by a baffle cap 272 which extends over the upper section 220 and engages the lower section 222 at the periphery thereof. The baffle cap is typically made of a material which has low vapor pressure during the hottest operation—that is, degassing, such as molybdenum or nickel. The upper section 220 is supported on the lower section 222 by portion 274 of upper section 220, the baffle cap 272 assisting in holding the upper and lower sections together. Moreover, the baffle cap absorbs the heat radiated by filament 240 to dissipate it over a larger volume. As can be seen in FIG. 22, the gauge 16 is disposed in a metallic tube 276 and thus functions as a nude tube in this embodiment. Tube 276 tends to be heated by filament 240 however, due to the presence of baffle cap 272, the temperature rise of tube 276 is substantially lessened. Furthermore, the baffle cap 272 prevents flashing over from the anode to tube 276.

Holes 278 in the baffle cap are provided to permit communication between gauge 16 and chamber 14. Moreover, apertures 280 are provided in a cavity 282 formed in the upper surface of upper section 220. Apertures 280 complete the communication path for the gas between the chamber and the interior of gauge 16. Due to the non-alignment of apertures 278 with respect to apertures 280, the combination thereof serves as a plasma screen in the same manner as described hereinbefore with respect to FIG. 18.

Figure 23:
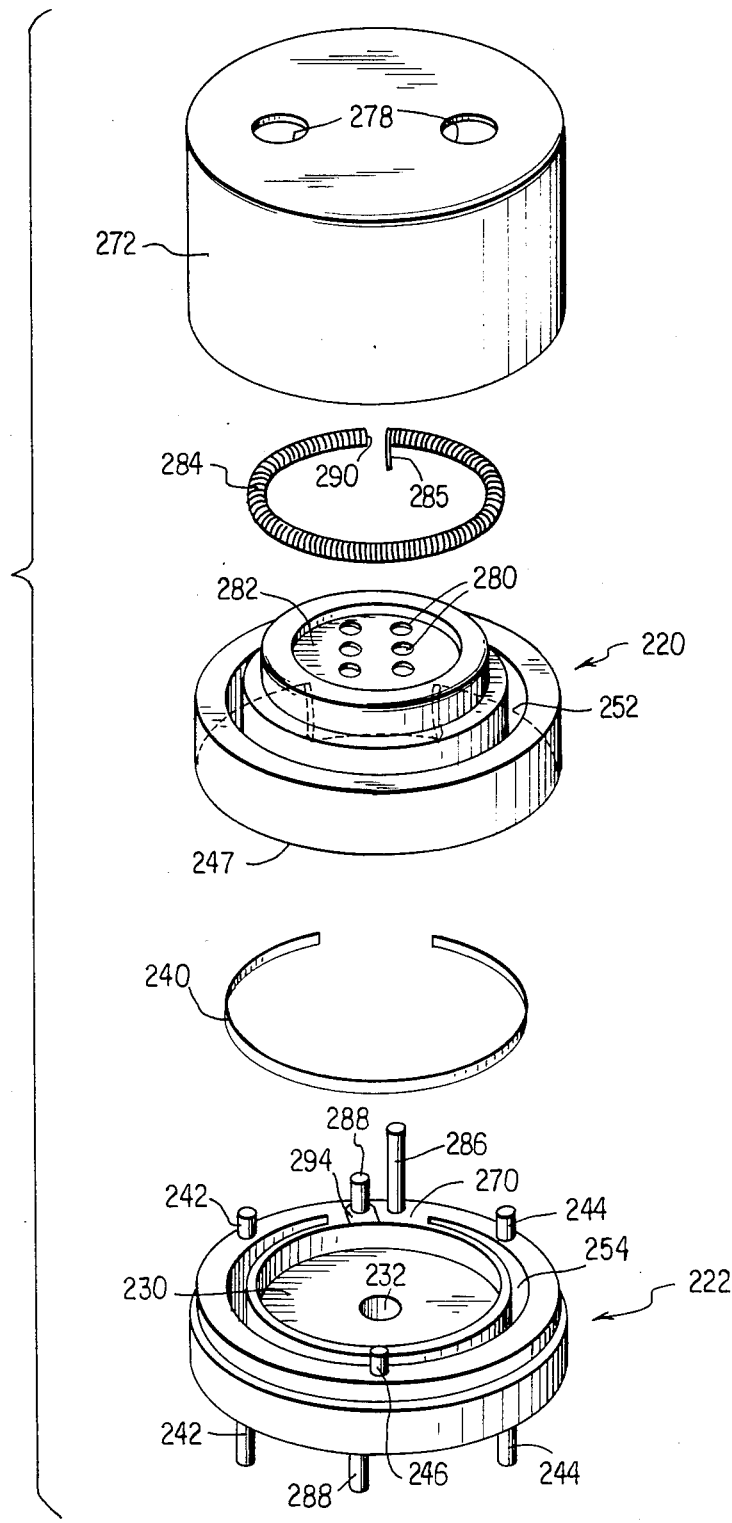

I²R filament 284 is disposed at the periphery of the upper portion of upper section 220. As shown in FIG. 22, an annular insulating member 287 made of alumina or the like prevents filament 284 from contacting baffle cap 272. As shown in FIG. 23, filament 284 has a pin 285 connected to one end thereof for delivering current thereto. Pin 285 extends through insulating tube 286, the latter tube extending from filament 284 through upper section 220 and lower section 222 to a header assembly (not shown) for mounting gauge 16. Electrical current for filament 240 is also provided from pins located on the header to pins 242 and 244.

The voltage for the anode is provided from a pin 288, which, as can be seen in FIG. 22, extends through a hole 296 in lower section 222 and a hole 298 in upper section 220 where it also removes current from I²R filament 284 from end 290 thereof, the connecton between pin 288 and filament 284 being diagrammatically indicated at 292 in FIG. 22. As shown in FIG. 23, a portion 294 of the metallic anode is also coated onto portion of the upper surface of lower section 222. Moreover, this coating extends at least partially through the interior surface of hole 296 (FIG. 22). Thus, it can be seen pin 288 is in electrical contact with the anode surface of cavity 230 due to the coated portion 294 and the coating formed within hole 296. In a simlar manner, a coated, metallic portion (not shown) is formed on the lower surface of upper section 220 together with a coating formed on the interior surface of hole 298 (see FIG. 22) of upper section 220. Again, an electrical connection is thus established between pin 288 and the anode surface of cavity 224. The enhance the electrical and mechanical connection between pin 288 and holes 296 and 298, the pin may be force-fit into these holes where the surface of pin 288 is preferably knurled or otherwise roughened.

In summary, the improved gauge of FIGS. 22 and 23 is characterized by:

(1) the anode structure is preferably divided into two sections 220 and 222 horizontally at the base of the electron inlet slot 247.

(2) sections 220 and 222 are preferably made of a ceramic or a like material. In general, the material should be electrically insulating and heat resistant.

(3) all electrodes are coated into and onto the ceramic sections 220 and 222 except the I₂R heater 284, filament 247 and collector 236.

(4) the ceramic sections 220 and 222 are compatible in correct alignment only, this alignment being affected at least by pin 288 and tube 286. Of course, other means such as a key and a slot arrangement may also be employed to further facilitate alignment.

(5) absolute location of filament 240 relative to electron inlet slit 247 is provided.

(6) built-in mounting pins and tubes such as pins 242 through 246 and 288 and tube 286 are provided.

(7) Narrow gaps 252, 254 are provided between focusing electrodes 220, 222 and the anode structure around the portion of the gauge where the filament is present.

(8) the ceramic sections 220 and 222 are preferably fabricated by press-molding.

Although described in connection with a nude gauge, the present invention may, of course, also be employed in a tubulated gauge with a glass or metal envelope.

The ceramic sections 220,222 not only provide the structure of the gauge with its attendant mechanical strength but also provide surfaces upon which the gauge electrodes may be coated thus resulting in a number of substantial advantages such as a substantial reduction in parts count and reduction in assembly time. Furthermore, critical relationships are maintained by the mold. The electrodes tend not warp to change important relationships for they are coated onto the stable ceramics. The entire structure including the collector electrode 236 is preferably integral and independent of the header upon which it is mounted. Accordingly, the structural strength is great and the electrode relationships are fixed.

Although an occasional gauge part has previously been made from metallized ceramic, the present invention is differentiated from the foregoing in that the ceramic structure of the present invention provides the mechanical strength for the entire gauge and also provides surfaces upon which at least several of the gauge electrodes may be coated thereby resulting in the advantages mentioned above and in the following advantages with respect to cost, assembly convenience, and stability.

Finally, it is to be understood that the foregoing embodiment is not restricted to the implementation of the gauge of FIG. 16 but may be employed in other gauges and other structures utilized in a high vacuum environment.

Other modifications of the embodiment of FIGS. 22 and 23 will be evident to those of ordinary skill in the art. Thus, for example, baffle cap 272 need not completely cover the space behind filament 240. Rather, it may terminate above the space behind the filament. Moreover, the space behind the filament may be blocked off by a band disposed behind the filament which could be made of a material such as molybdenum and thus serve as a plasma shield. In a further modification of the invention, the focusing electrodes 248 and 250 need not be coated on the upper and lower sections 220 and 222. Rather, a discrete pair of semicircular U-shaped guard rings may be employed which would be mounted with respect to pins 242 through 246.

It is to be understood that the above detailed description of the various embodiments of the invention is provided by way of example only. Various details of design and construction may be modified without departing from the true spirit and scope of the invention as set forth in the appended claims.

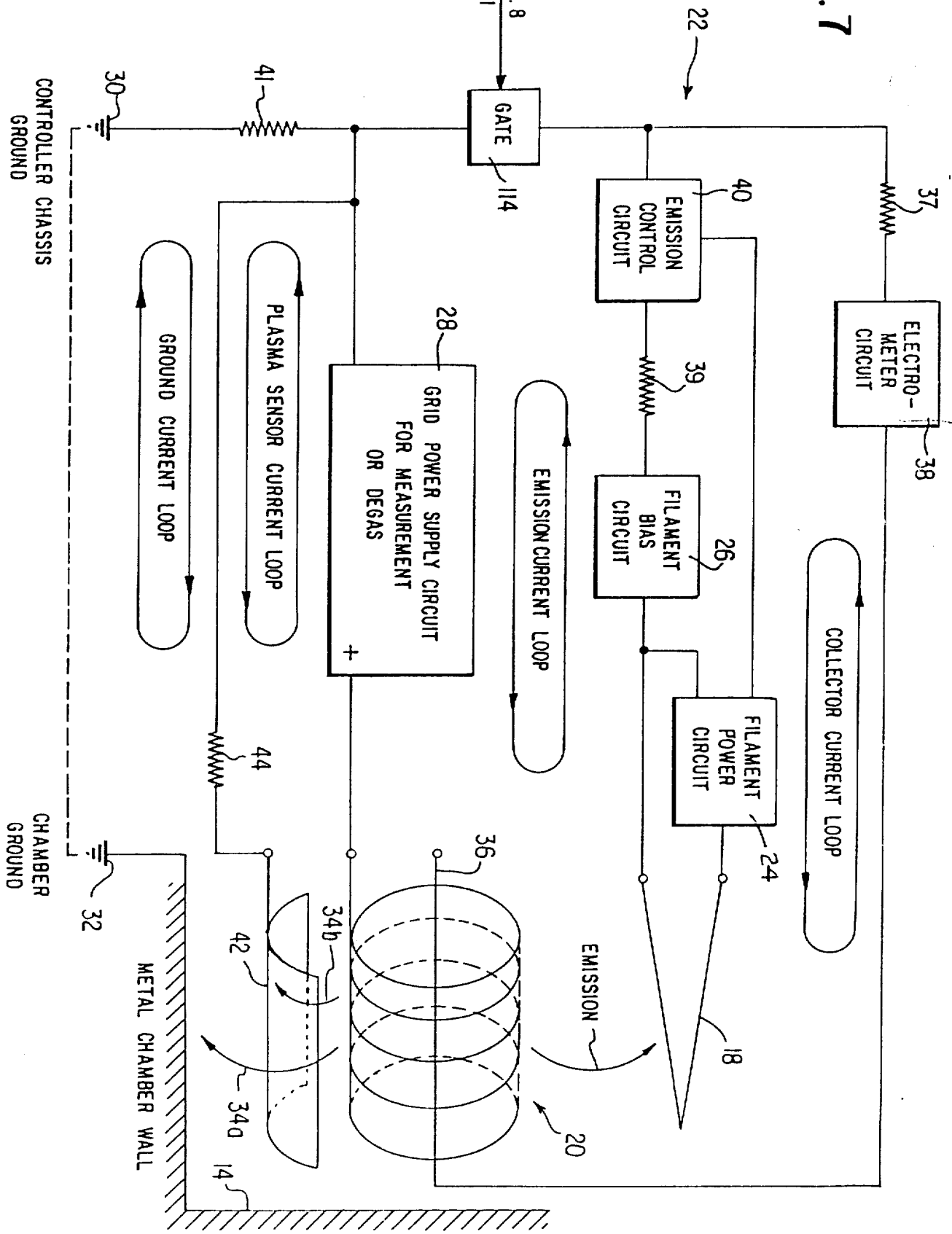

What is claimed is:

1. In an ionization gauge system for measuring the pressure in a chamber, said system including a gauge including a filament, a grid, and a collector, controller circuitry for controlling current applied to said filament and a voltage applied to said grid, and electrometer circuitry for measuring the current through said collector to determine the chamber pressure where said controller circuitry, electrometer circuitry and said chamber are connected to a ground potential, the improvement comprising means for sensing a ground current caused by plasma generated within said gauge and coupled to said chamber from said grid, said ground current flowing from the walls of said chamber to said ground potential and then from said ground potential through said controller circuitry to said grid; and means responsive to said ground current sensing means for disabling said controller circuitry in response to the sensed ground current being substantially less than the ground current expected for a given chamber pressure to thereby detect an abnormality in the ground current and thus protect a human operator from such abnormality in the ground current.

2. The improvement as in claim 1 including means for determining said expected ground current including a memory having a plurality of addressable locations which respectively store a plurality of ground current values where said ground current values respectively correspond to a plurality of pressure values and means for addressing said memory with a pressure value corresponding to an existing pressure in said gauge to thus determine the expected ground current corresponding to the existing pressure.

3. The improvement as in claim 1 including means for determining said expected ground current including (a) means for establishing a predetermined pressure value which corresponds to a pressure which must be exceeded before said sensed ground current becomes dangerous to a human operator and (b) means for establishing the ground current which should flow at said predetermined pressure value to thus determine the expected ground current.

4. The improvement as in claim 1 wherein said controller circuitry disabling means includes means for disabling the controller circuitry in response to the sensed ground current deviating by more than a predetermined amount from said expected ground current to thus detect any abnormality in the ground circuit.

5. The improvement as in claim 1 wherein said gauge includes means for sensing a plasma current corresponding to a density of at least some of said plasma coupled between the grid and the chamber wall and means responsive to said plasma current for extending a measurement range of the ionization gauge system.

6. The improvement as in claim 5 where a ratio of said collector current to said plasma current is less than a predetermined value for pressures less than a predetermined pressure and greater than said predetermined value for pressures greater than said predetermined pressure and where said gauge includes ratio determining means responsive to the collector current and the plasma current for determining said ratio therebetween; first pressure measurement means responsive to said collector current and said ratio for providing a pressure measurement when said pressure is less than said predetermined pressure in response to said ratio being less than said predetermined value; and second pressure measurement when said pressure is greater than said predetermined value to thereby extend the measurement range of the ionization gauge system beyond said predetermined pressure.

7. In an ionization gauge system for measuring the pressure in a chamber, said system including a gauge including a filament, a grid, and a collector, controller circuitry for controlling current applied to said filament and a voltage applied to said grid, and electrometer circuitry for measuring a current through said collector to determine the chamber pressure, the improvement comprising:

means for sensing a plasma current corresponding to a density of plasma generated within the gauge and coupled between the grid and the chamber wall; and means responsive to said plasma current for extending the measurement range of the ionization gauge system.

8. The improvement as in claim 7 where a ratio of said collector current to said plasma current is less than a predetermined value for pressures less than a predetermined pressure and greater than said predetermined value for pressures greater than said predetermined pressure and where said gauge includes ratio determining means responsive to the collector current and the plasma current for determining said ratio therebetween; first pressure measurement means responsive to said collector current and said ratio for providing a pressure measurement when said pressure is less than said predetermined pressure in response to said ratio being less than said predetermined value; and second pressure measurement means responsive to said collector current and said ratio for providing a pressure measurement when said pressure is greater than said predetermined pressure in response to said ratio being greater than said predetermined value to thereby extend the measurement range of the ionization gauge system beyond said predetermined pressure.

9. The improvement as in claim 8 where said first and second pressure measurement means each comprise a memory having a plurality of addressable locations which respectively store a plurality of pressure values where said pressure values respectively correspond to a plurality of collector current values and means for addressing said memory with the collector current measured by said electrometer circuitry to determine the pressure corresponding to the measured collector current.

10. The improvement as in claim 7 where said plasma current sensing means includes at least one electrode disposed in said gauge outside said grid.

11. The improvement as in claim 7 where said collector current increases with increasing pressure up to a first pressure, and then slowly changes between said first pressure and a second pressure greater than said first pressure, and then decreases with increasing pressure above said second pressure and where the ratio of said collector current to said plasma current changes at a rate substantially greater than the rate of change of the collector current between said first and second pressures and where said gauge includes means responsive to the collector current and the plasma current for determining said ratio therebetween; and means responsive to said ratio for providing a pressure measurement to thereby render said ionization gauge system more accurate in the range between said first and second pressures.

12. In an ionization gauge system for measuring the pressure in a chamber, said system including a gauge including a filament, a grid, and a collector, controller circuitry for controlling current applied to said filament and a voltage applied to said grid, and electrometer circuitry for measuring the current through said collector to determine the chamber pressure, the improvement comprising:
means for isolating at least said chamber or said controller circuitry from ground.

13. The improvement as in claim 12 where said isolating means isolates the controller circuitry from ground.

14. In an ionization gauge system for measuring the pressure in a chamber, said system including a gauge including a filament, a grid, and a collector, controller circuitry for controlling current applied to said filament and a voltage applied to said grid, and electrometer circuitry for measuring the current through said collector to determine the chamber pressure, there being a tendency for plasma generated within said gauge to flow to said chamber from said grid and thus cause a ground current which flows from the walls of said chamber to a ground potential and then from the ground potential through said controller circuitry back to said grid, the improvement comprising:
means for reducing the plasma reaching said chamber to an amount such that the level of the resulting ground current is not dangerous to a human operator.

15. The improvement in claim 14 where the plasma coupled to said chamber has a conductance no greater than about one-half milliampere.

16. The improvement as in claim 14 where said plasma reducing means includes means for substantially confining the plasma within said grid.

17. The improvement as in claim 16 where said grid is a substantially closed structure having apertures therein for permitting a communication of gas from the chamber to an ionization volume within the grid, an opening in said grid for permitting an entry of electrons emitted by said filament into said volume, and a collector aperture through which said collector extends into said volume.

18. The improvement as in claim 17 including at least one screen disposed over the aperatures which permit gas communication between the chamber and said volume.

19. The improvement as in claim 17 where said filament is disposed outside said ionization volume and where said gauge includes means for enclosing the filament within a space adjacent said opening in the grid.

20. The improvement as in 19 where said filament enclosing means includes focusing electrodes spaced from and disposed above and below said filament to effect injection of substantially all said electrons into said ionization volume, said focusing electrodes at least partially defining the upper and lower surfaces of the means for enclosing the filament.

21. The improvement as in claim 20 where said filament enclosing means includes at least a pair of electrical insulators disposed above and below said filament where each insulator is disposed between an associated focusing electrode and the grid.

22. The improvement as in claim 21 wherein a slit is disposed in each of said insulators, each said slit being disposed adjacent its associated focusing electrode to prevent sputtering of a conductive coating between its associated focusing electrode and the grid.

23. The improvement as in claim 22 where said filament enclosing means also includes a member spaced from and disposed on the side of said filament opposite the side thereof adjacent the opening in the enclosed grid.

24. The improvement as in claim 23 where said member comprises an electrically insulating material.

25. The improvement as in claim 23 wherein said member comprises an electrically conductive material.

26. The improvement as in claim 22 where a pair of said slits are formed for each of said focusing electrodes at opposite ends thereof.

27. The improvement as in claim 22 where each of said slits includes a first portion extending substantially parallel to its associated focusing electrode and a second portion extending substantially perpendicular with respect to its associated focusing electrode.

28. The improvement as in claim 17 where said grid comprises at least two sections made of an electrically insulating material where each of said sections include at least one cavity, said sections being connected to one another such that said cavities face one another to form said ionization volume and where said grid comprises a metallic coating disposed on an interior surfaces of the cavities of said first and second sections.

29. The improvement as in claim 28 where said opening in the grid is disposed at a base of a first one of said two sections.

30. The improvement as in claim 28 where each of said sections comprises a ceramic material.

31. The improvement as in claim 28 where said filament is disposed outside said ionization volume and said gauge includes focusing electrodes spaced from and disposed above and below said filament, said focusing electrodes being respectively coated on said first and second sections.

32. The improvement as in claim 31 where said filament is semi-circular in configuration and is supported by at least two pins extending from said second section.

33. The improvement as in claim 28 where said lower section includes an opening extending through the base thereof and said collector comprises a pin axially extending through said opening and a disc attached to the second portion of said pin.

34. The improvement as in claim 31 where gaps are respectively provided in said first and second sections between the grid and focusing electrodes to prevent sputtering of a conductive coating therebetween.

35. The improvement as in claim 32 where each of said sections is fabricated by press molding.

36. The improvement as in claim 31 including a baffle cap extending over said first section and contacting said second section to enclose the space behind said filament.

37. The improvement as in claim 17 where said gauge is disposed within a metallic tube.

38. The improvement as in claim 17 where said gauge is disposed within a glass tube.

39. The improvement as in claim 28 including a baffle cap extending at least partially over a first one of said two sections, said baffle cap including a plurality of apertures disposed therein and said first section having an upper surface with a further plurality of apertures disposed in said upper surface, the apertures in the baffle cap and the upper section permitting communication of gas between the chamber and the ionization volume.

40. The improvement as in claim 39 where the apertures in the baffle cap are non-aligned with respect to those in the upper surface of the upper section to thus substantially prevent the flow of plasma from within the ionization volume to the chamber and/or vice versa.

41. The improvement as in claim 14 where said plasma reducing means includes means for substantially preventing the flow of plasma from within the grid to said chamber, said flow preventing means being disposed between the grid and the chamber.

42. The improvement as in claim 41 where said gauge has a glass envelope and a glass conduit connected thereto for connecting the gauge to the chamber and where said system includes at least one screen disposed in the glass conduit to substantially prevent the flow of plasma from the gauge to the chamber.

43. The improvement as in claim 42 including two of said screens where a mesh of a screen closer to said gauge is coarser than that of a screen closer to the chamber.

44. The improvement as in claim 43 where the mesh of the screen closer to the gauge is about 1/16th inch and the mesh of the other screen is about 1/32 inch, and a spacing therebetween being about ¼ inch.

45. The improvement as in claim 42 where said gauge includes a glass envelope and a glass conduit connected thereto for connecting the gauge to the chamber and where said system includes means disposed within said glass conduit for substantially preventing the flow of said plasma from the gauge to the chamber, said latter means providing at least one solid surface at which ions and electrons can combine.

46. The improvement as in claim 45 where said means disposed in the conduit comprises a plurality of parallel tubes, axes of which are substantially parallel to an axis of the conduit.

47. The improvement as in claim 45 where the means in the conduit comprises a plurality of spaced, adjacent, parallel plates, planes of which are substantially parallel to an axis of the conduit.

48. The improvement as in claim 45 where a material of which said solid surface is composed is selected from a group consisting of metals, ceramics, and glass.

49. The improvement as in claim 41 where said means for substantially preventing plasma flow from the gauge to the chamber includes at least one wire cage disposed about said grid.

50. The improvement as in claim 49 where said grid and cage are disposed within a glass envelope.

51. The improvement as in claim 49 where said grid and said cage are disposed wtihin a metallic tube.

52. An ionization chamber for high vacuum use comprising a first section composed of an electrically insulating material, said first section having at least a first internal cavity which corresponds to an ionization volume;

a second section formed of said electrically insulating material, said first and second sections being disposed adjacent to and connected to one another to enclose said ionization volume;

at least one first electrode formed within said ionization volume as a metallic coating on at least one of said first and second sections;

at least one second electrode for ejecting electrons into said ionization volume;

means for establishing a potential difference between said first electrode and said second electrode such that the electrons are attracted toward the first electrode; and at least one of said first and second sections having at least one first aperture therein for facilitating the flow of gas into said ionization volume, said gas being ionized due to impacts with said electrons in said ionization volume.

53. An ionization chamber as in claim 52 where said first and second sections constitute a pressure measurement device for a sputter coating system.

54. An ionization chamber as in claim 52 where said first and second sections constitute a pressure measurement device for a vacuum arc coating system.

55. An ionization chamber as in claim 52 where said first and second sections constitute an ionizing source for a mass spectrometer.

56. An ionization chamber as in claim 52 where said first and second sections constitute an ionization gauge.

57. An ionization chamber as in claim 56 including an opening in at least one of said first and second sections and where said cathode is disposed outside said first and second sections adjacent said opening for ejecting said electrons into said ionization volume.

58. An ionization chamber as in claim 57 where at least one of said first and second sections has a further opening therein; and a collector electrode extending at least partially through said opening for collecting the ionized gas to thus facilitate the measurement of the pressure of said gas.

59. The ionization chamber as in claim 58 where said collector comprises a pin axially extending through said opening and a disc attached to the lower portion of said pin.

60. The ionization chamber as in claim 58 where each of said sections includes at least one cavity, said sections being connected to one another such that said cavities face one another to form said ionization volume and where said first electrode comprises a metallic coating disposed on the interior surfaces of the cavities of said first and second sections.

61. An ionization chamber as in claim 60 where said opening in at least one of said first and second sections is disposed in the base of the first section.

62. The ionization chamber as in claim 57 including focusing electrodes spaced from and disposed above and below said second electrode, said focusing electrodes being respectively coated on said first and second sections.

63. The ionization chamber as in claim 62 where gaps are respectively provided in said first and second sections between the first electrode and focusing electrodes to prevent sputtering and evaporation of a conductive coating therebetween.

64. The ionization chamber as in claim 62 including a baffle cap extending over said first section and contacting said second section to enclose a space behind said second electrode.

65. The ionization chamber as in claim 52 where each of said sections comprises a ceramic material.

66. The ionization chamber as in claim 65 where each of said sections is fabricated by press molding.

67. The ionization chamber as in claim 56 where said gauge is disposed within a metallic tube.

68. The ionization chamber as in claim 56 where said gauge is disposed within a glass tube.

69. The ionization chamber as in claim 52 including a baffle cap extending at least partially over a first one of said two sections, said baffle cap including a plurality of apertures disposed therein and said first section having an upper surface with a further plurality of apertures disposed in said upper surface, the apertures in the baffle cap and the upper section permitting communication of gas between the chamber and the ionization volume.

70. The improvement as in claim 69 where the apertures in the baffle cap are non-aligned with respect to those in the upper surface of the upper section to thus substantially prevent the flow of plasma from within the ionization volume to the chamber.

* * * * *

UNITED STATES PATENT AND TRADEMARK OFFICE
CERTIFICATE OF CORRECTION

PATENT NO. : 4,714,891

DATED : December 22, 1987

INVENTOR(S) : Charles F. Morrison, Jr.

Figure 2:
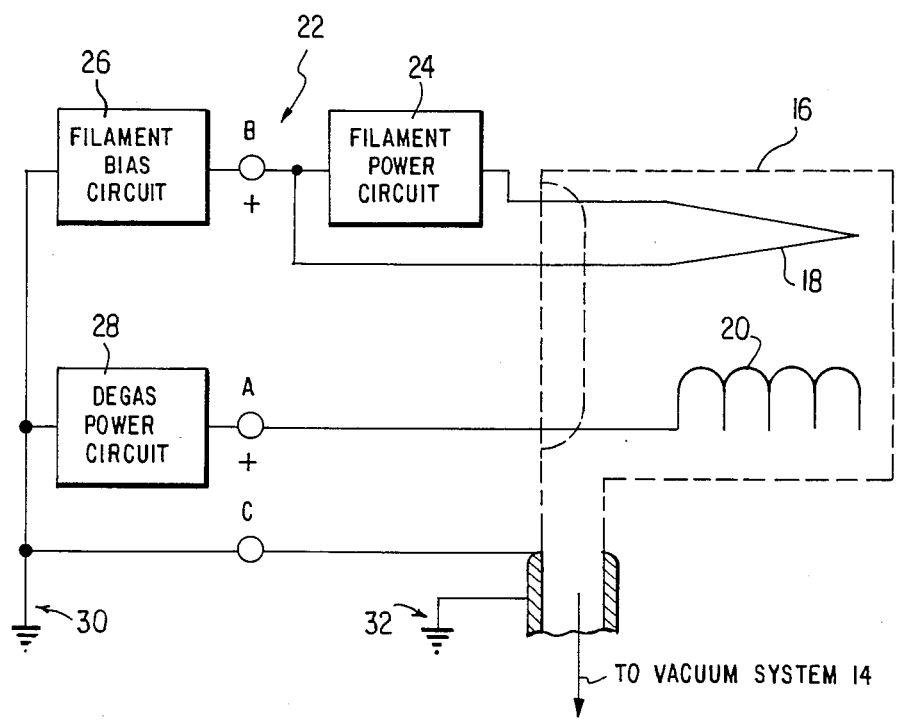
FIG. 2 is a partial diagram of a prior art ionization gauge and its associated controller.
Figure 3:
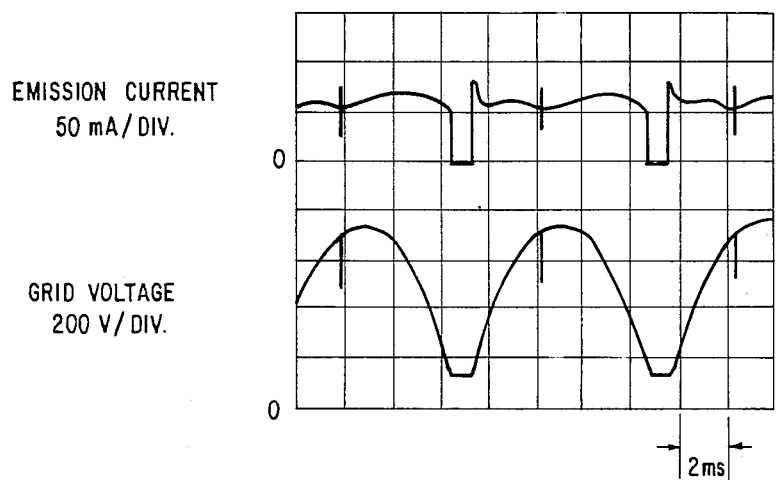
FIG. 3 illustrates emission current and grid voltage waveforms normally occurring in an ionization gauge as displayed on an oscilloscope.
Figure 4:
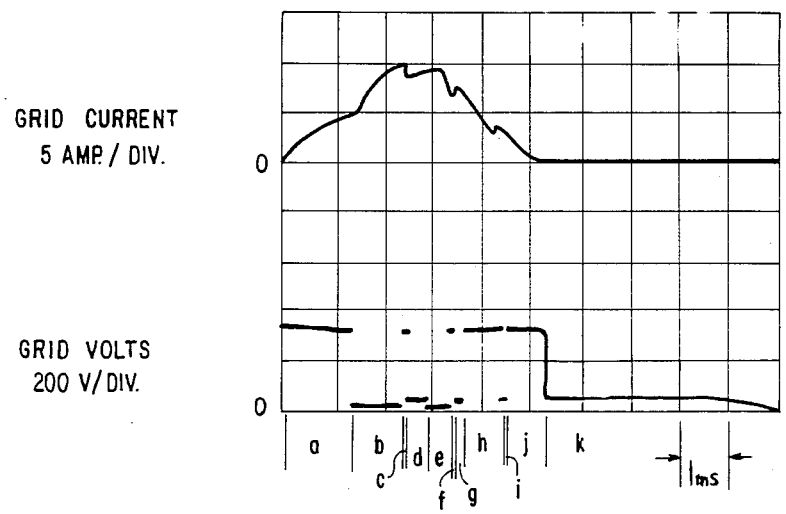
FIG. 4 illustrates a typical destructive half cycle of the emission current and grid voltage which occur in an ionization gauge when the pressure is raised to a predetermined value.

It is certified that error appears in the above-identified patent and that said Letters Patent is hereby corrected as shown below:

In the drawings, Figs. 2 and 7 should be deleted to appear as shown in the attached sheets.

In the printed patent, column 1, line 18, "electrocally" should be deleted and --electrically-- should be inserted.

Column 1, line 52, "hcarge" should be deleted and --charge-- should be inserted.

Column 2, line 58, "where" should be deleted and --when-- should be inserted.

Column 3, line 8, "clsoed" should be deleted and --closed-- should be inserted.

Column 3, line 54, "th" should be deleted and --the-- should be inserted.

Column 4, line 15, underground" should be deleted and --ungrounded-- should be inserted.

Column 5, line 32, "wil" should be deleted and --will-- should be inserted.

Column 8, line 65, "of" should be deleted and --to-- should be inserted.

Column 9, line 31, "bly" should be deleted and --ble-- should be inserted.

Column 22, line 20, "The" should be deleted and --To-- should be inserted.

UNITED STATES PATENT AND TRADEMARK OFFICE
CERTIFICATE OF CORRECTION

PATENT NO. : 4,714,891     Page 2 of 4

DATED      : December 22, 1987

INVENTOR(S): Charles F. Morrison, Jr.

It is certified that error appears in the above-identified patent and that said Letters Patent is hereby corrected as shown below:

Column 28, line 17, "within" should be deleted and --within-- should be inserted.

Signed and Sealed this

Twenty-third Day of August, 1988

*Attest:*

DONALD J. QUIGG

*Attesting Officer*     Commissioner of Patents and Trademarks

UNITED STATES PATENT AND TRADEMARK OFFICE
CERTIFICATE OF CORRECTION

PATENT NO. : 4,714,891

DATED : December 22, 1987

INVENTOR(S) : Charles F. Morrison, Jr.

Page 3 of 4

It is certified that error appears in the above-identified patent and that said Letters Patent is hereby corrected as shown below:

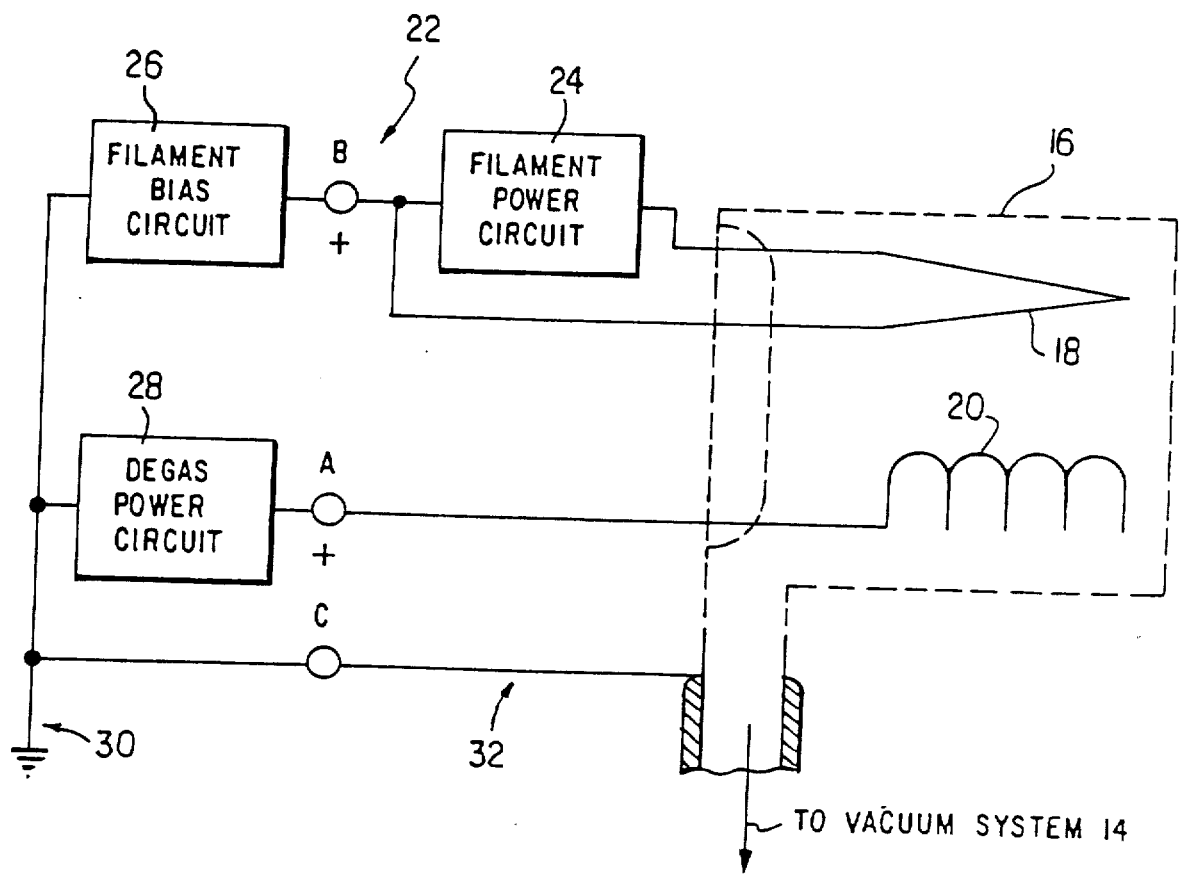

FIG. 2

(PRIOR ART)